(12) United States Patent
Franzino et al.

(10) Patent No.: US 9,011,255 B1
(45) Date of Patent: Apr. 21, 2015

(54) DRIVE SHAFT COUPLING HAVING SEALED INTERIOR PASSAGE FOR PRESSURIZED FLUID

(75) Inventors: Joseph J Franzino, Redding, CT (US); George M Cruz, Norwalk, CT (US)

(73) Assignee: Crossford International, LLC, Stamford, CT (US)

( * ) Notice: Subject to any disclaimer, the term of this patent is extended or adjusted under 35 U.S.C. 154(b) by 77 days.

(21) Appl. No.: 13/136,080

(22) Filed: Jul. 22, 2011

(51) Int. Cl.
| F16C 1/06 | (2006.01) |
| F16C 1/08 | (2006.01) |
| F16C 3/02 | (2006.01) |
| B08B 9/032 | (2006.01) |
| B08B 9/04 | (2006.01) |
| F28G 3/16 | (2006.01) |

(52) U.S. Cl.
CPC ............... F16C 3/02 (2013.01); *Y10S 464/901* (2013.01)

(58) Field of Classification Search
USPC ............ 464/52, 170, 177, 901; 285/305, 320, 285/321, 921
See application file for complete search history.

(56) References Cited

U.S. PATENT DOCUMENTS

| 2,352,019 | A | * | 6/1944 | Schott |
| 2,516,409 | A | * | 7/1950 | Osterhoudt ............... 285/320 X |
| 3,195,934 | A | * | 7/1965 | Parrish ...................... 285/321 X |
| 5,518,278 | A | * | 5/1996 | Sampson .................. 285/320 X |
| 6,053,540 | A | * | 4/2000 | Meyer ....................... 285/320 X |
| 6,264,360 | B1 | * | 7/2001 | Lehmusvaara et al. |
| 6,821,048 | B2 | * | 11/2004 | Talesky ..................... 464/52 X |
| 7,237,990 | B2 | * | 7/2007 | Deng |
| 7,453,857 | B2 | * | 11/2008 | Mangold et al. |
| 8,328,242 | B2 | * | 12/2012 | Guidry et al. .............. 285/321 |
| 2004/0046387 | A1 | * | 3/2004 | Niven et al. .................. 285/320 |
| 2006/0220380 | A1 | * | 10/2006 | Yoshino .................... 285/305 X |
| 2008/0100061 | A1 | * | 5/2008 | Sage et al. ..................... 285/305 |

* cited by examiner

*Primary Examiner* — Gregory Binda
*Assistant Examiner* — Matthieu Setliff
(74) *Attorney, Agent, or Firm* — Patrick J. Walsh

(57) ABSTRACT

A coupling for connecting a rotating tube cleaning shaft to a tube cleaning machine where high pressure fluid is pumped through the coupling, where the coupling is sealed to contain the high pressure fluid, and where a machine driven rotary flexible shaft passes through the coupling.

8 Claims, 22 Drawing Sheets

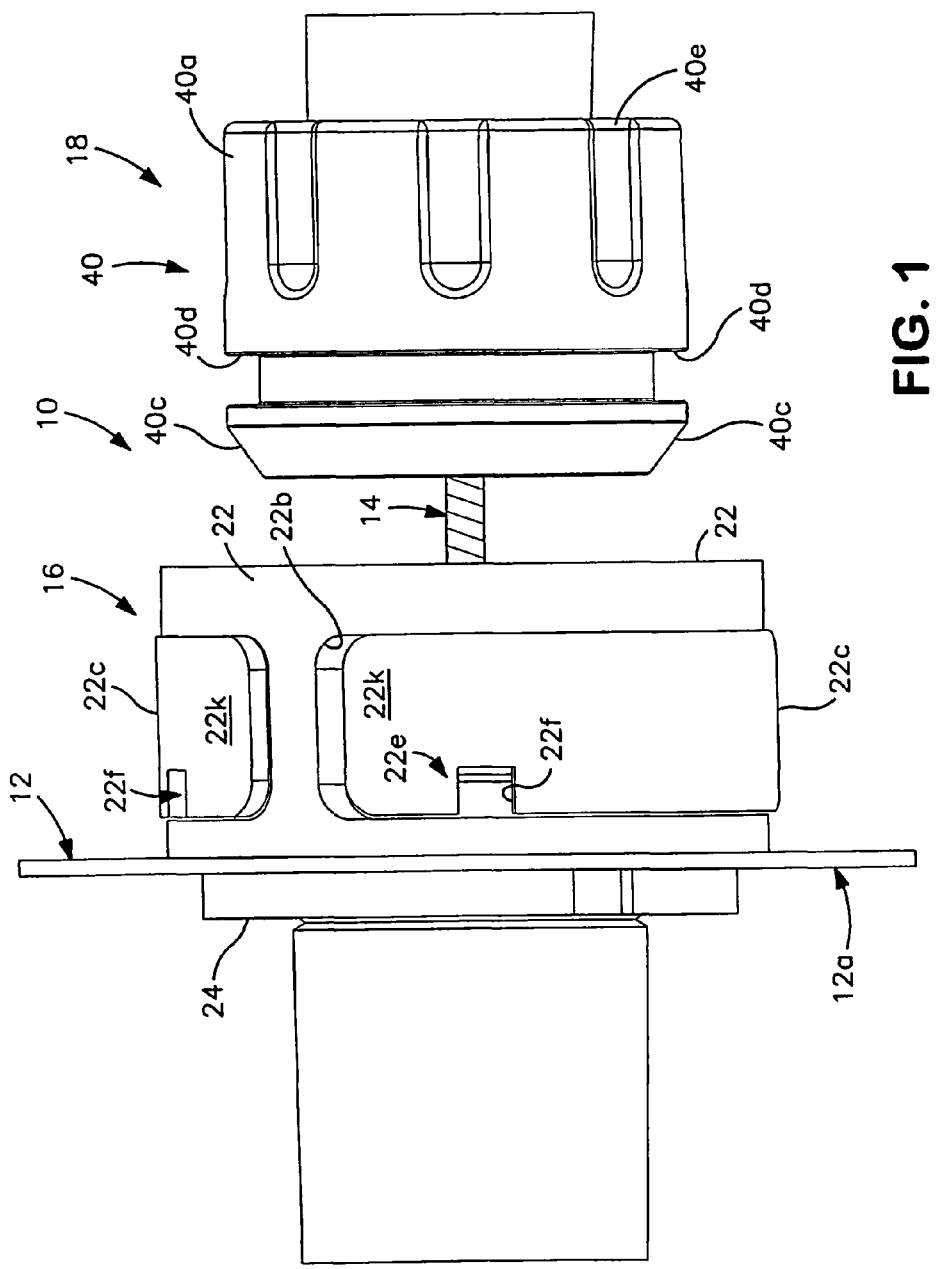

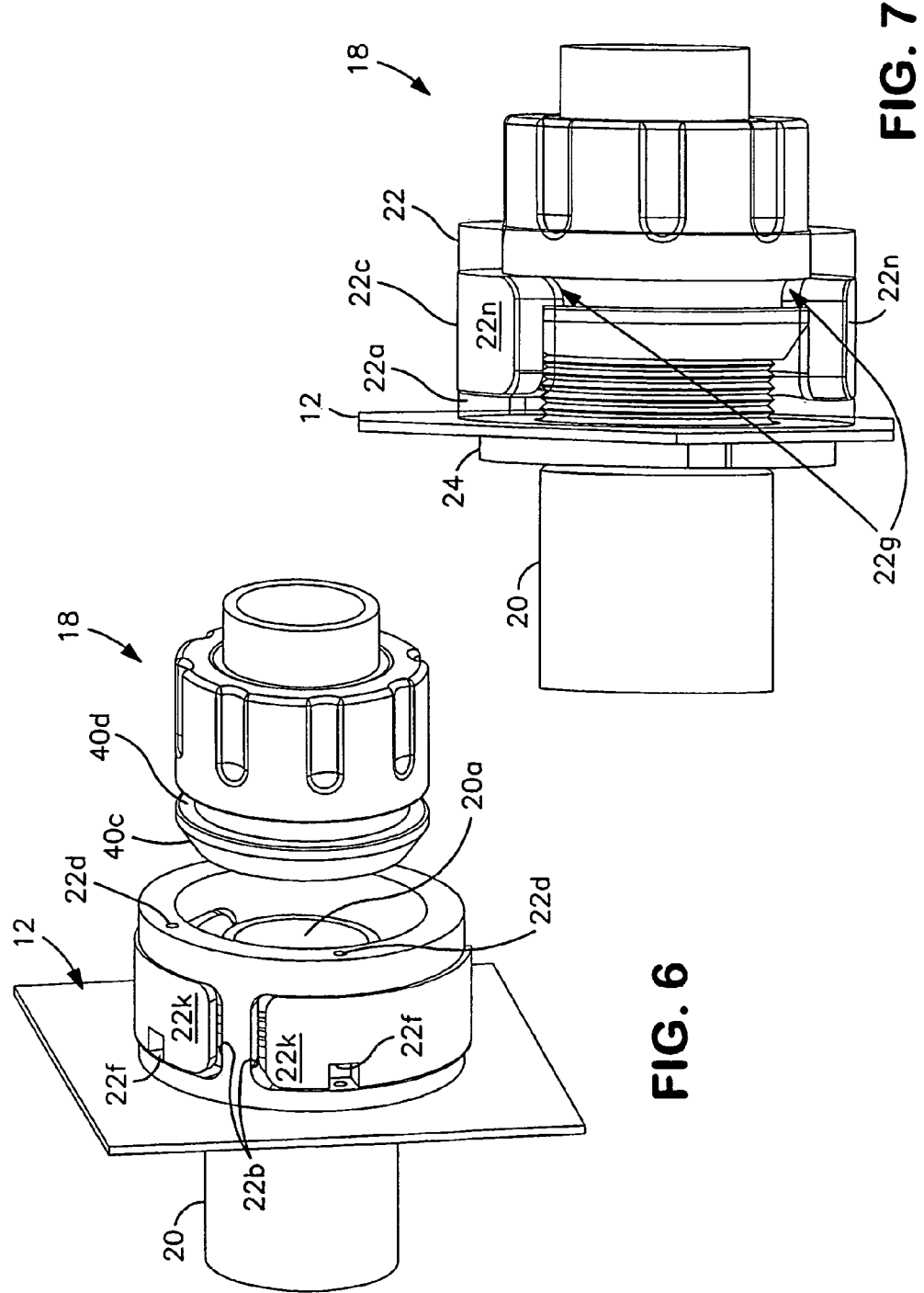

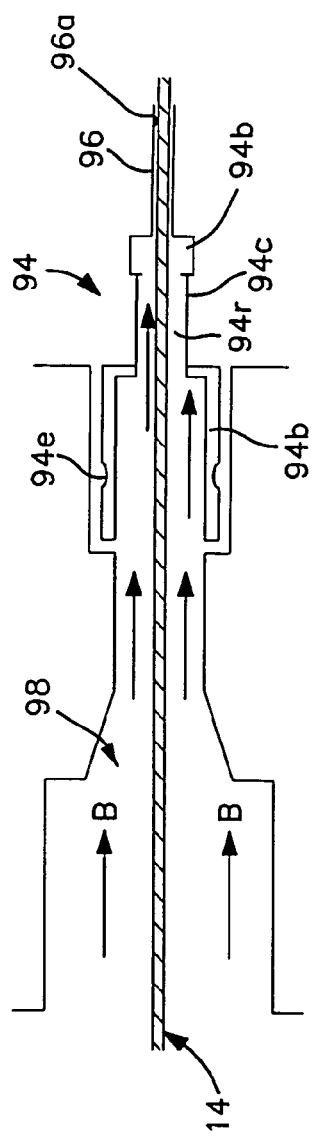
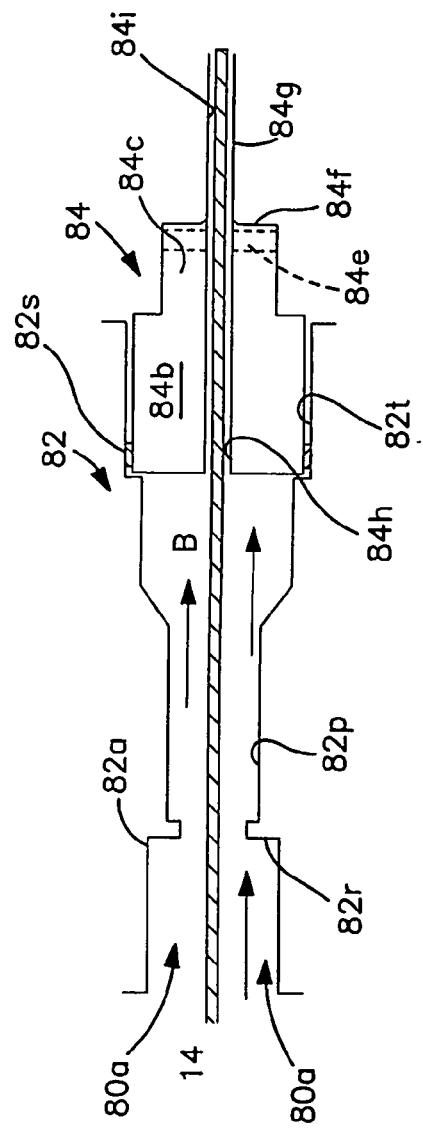

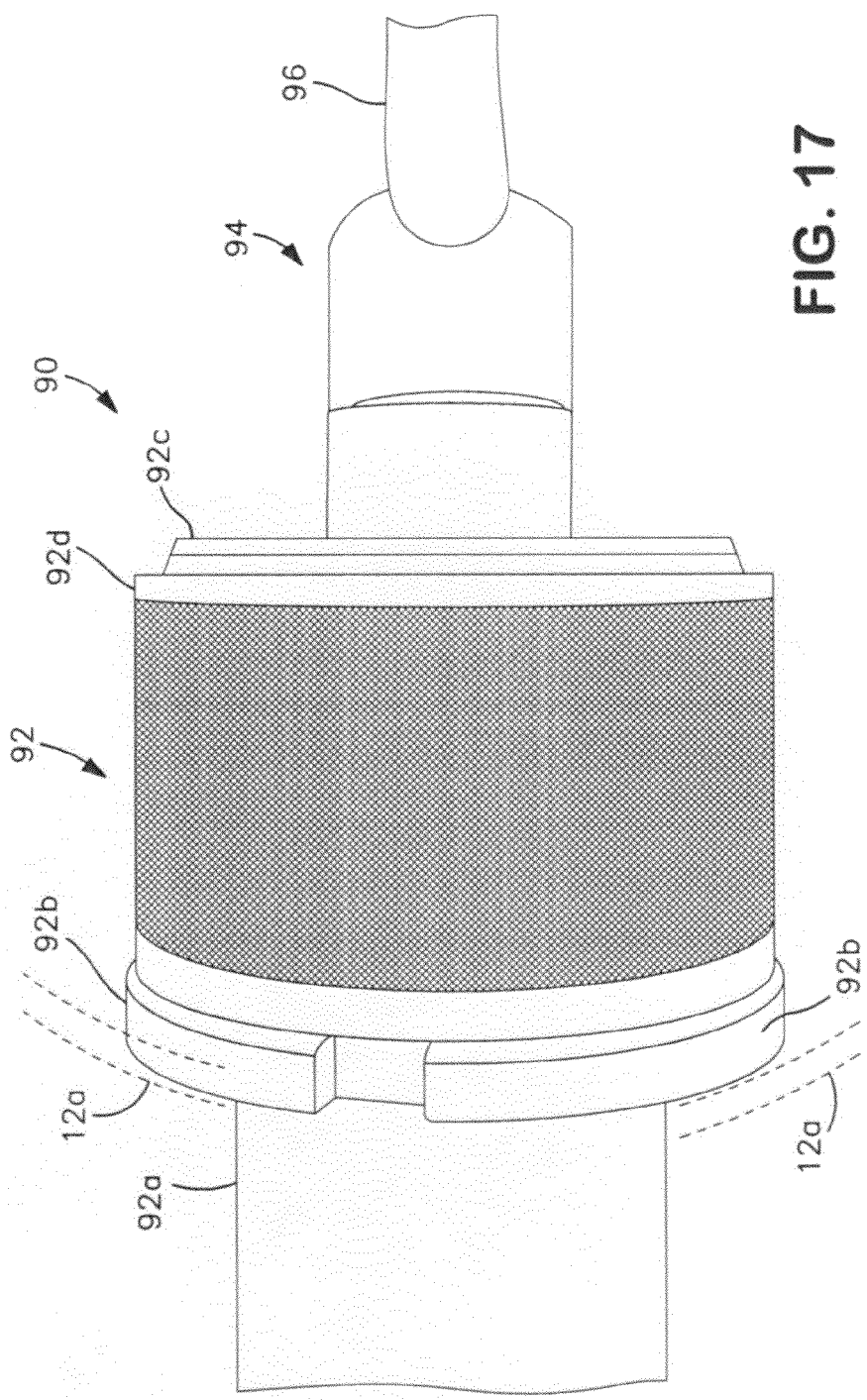

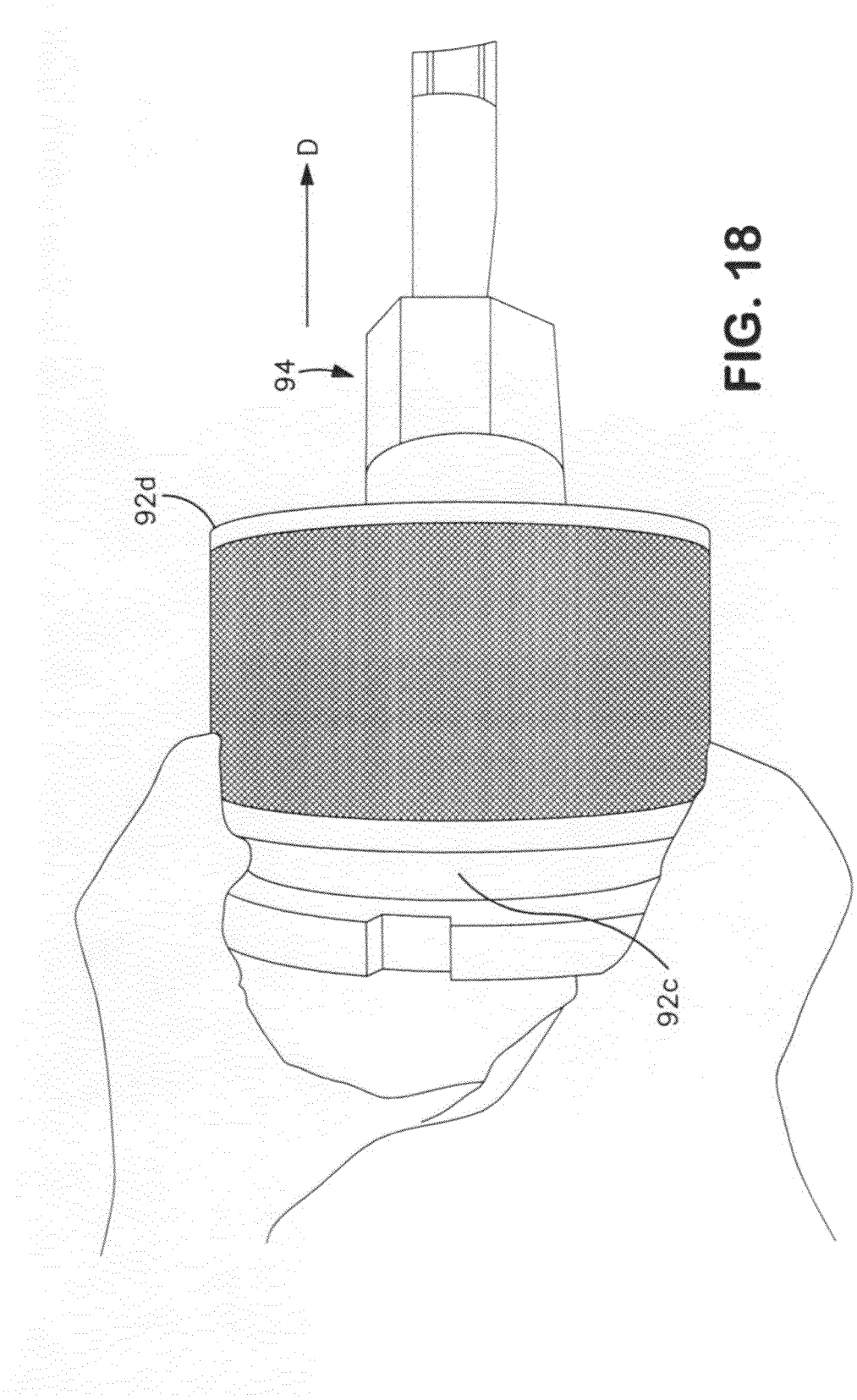

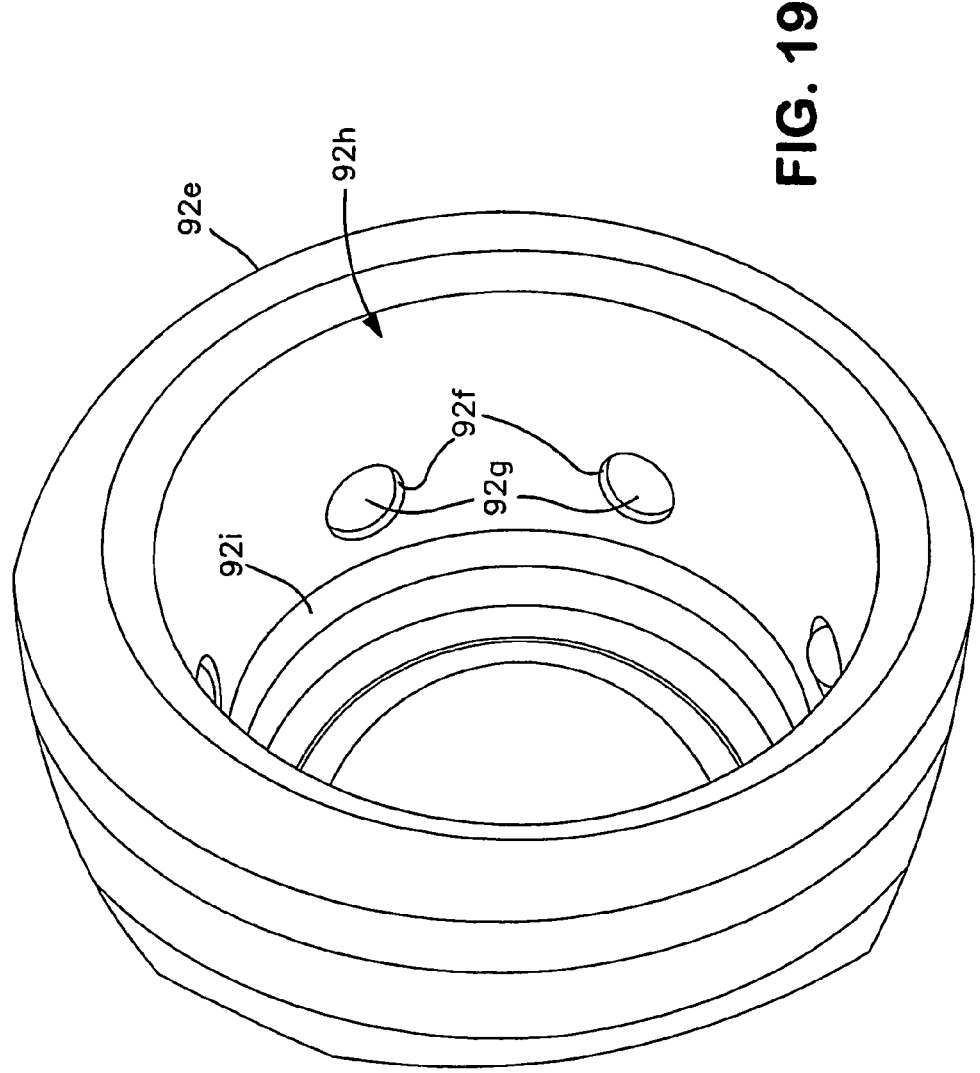

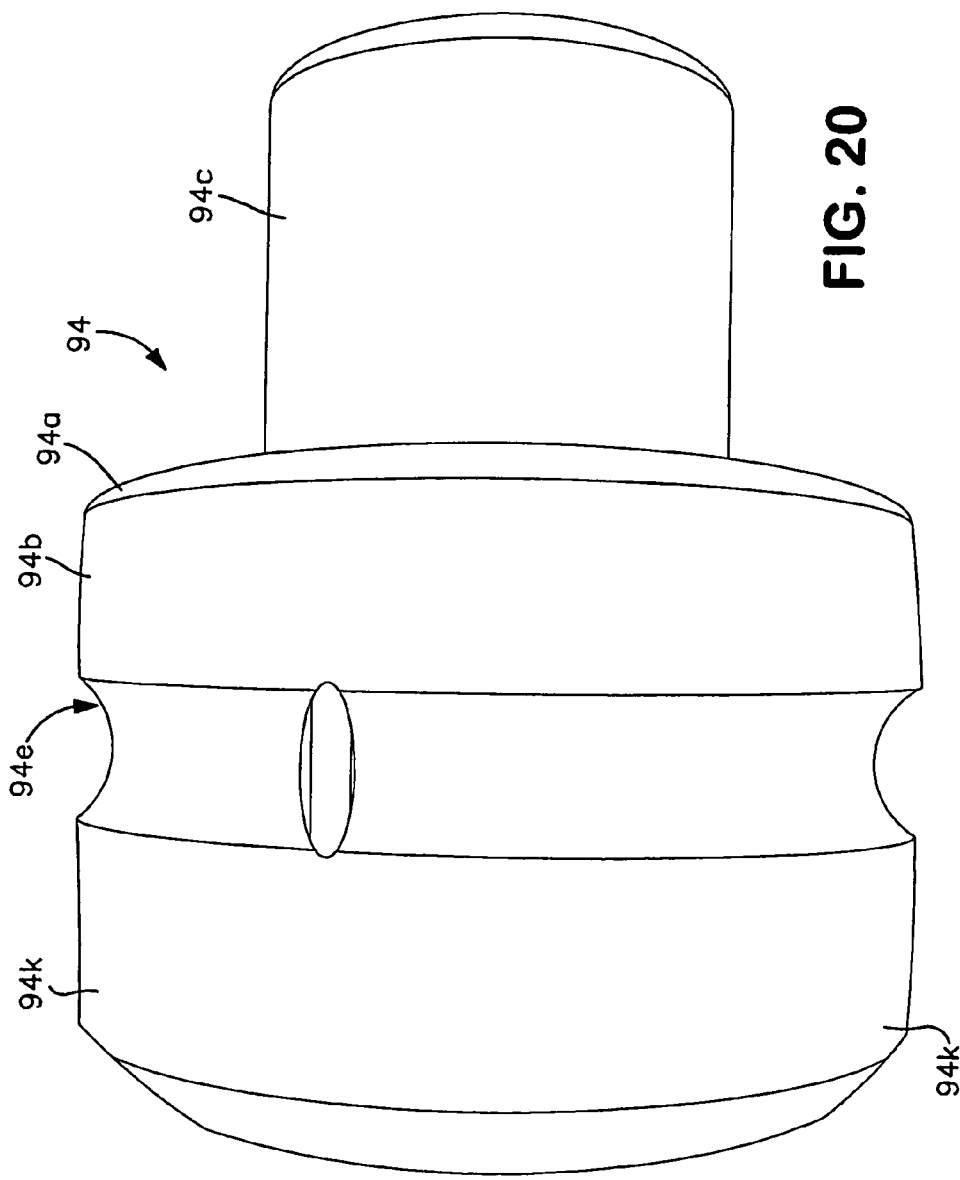

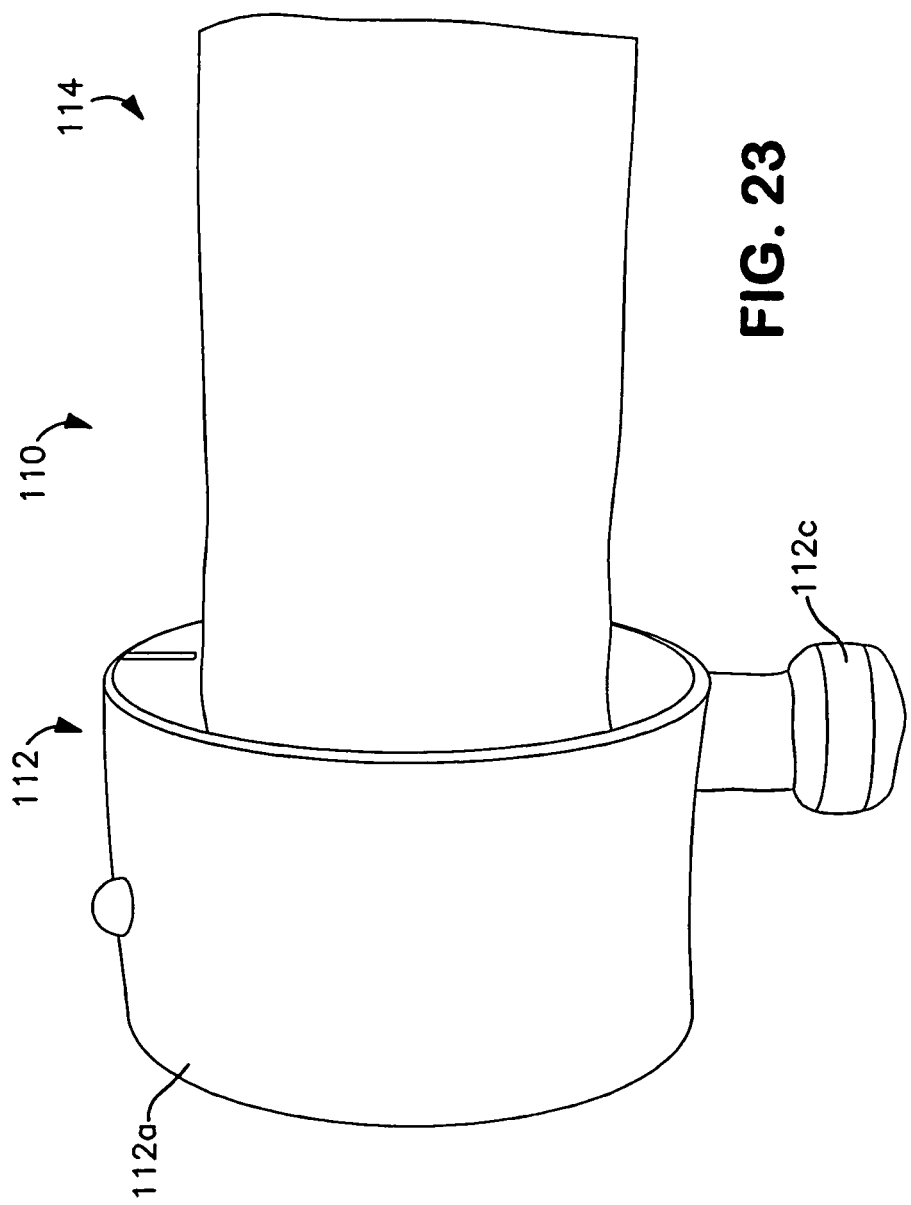

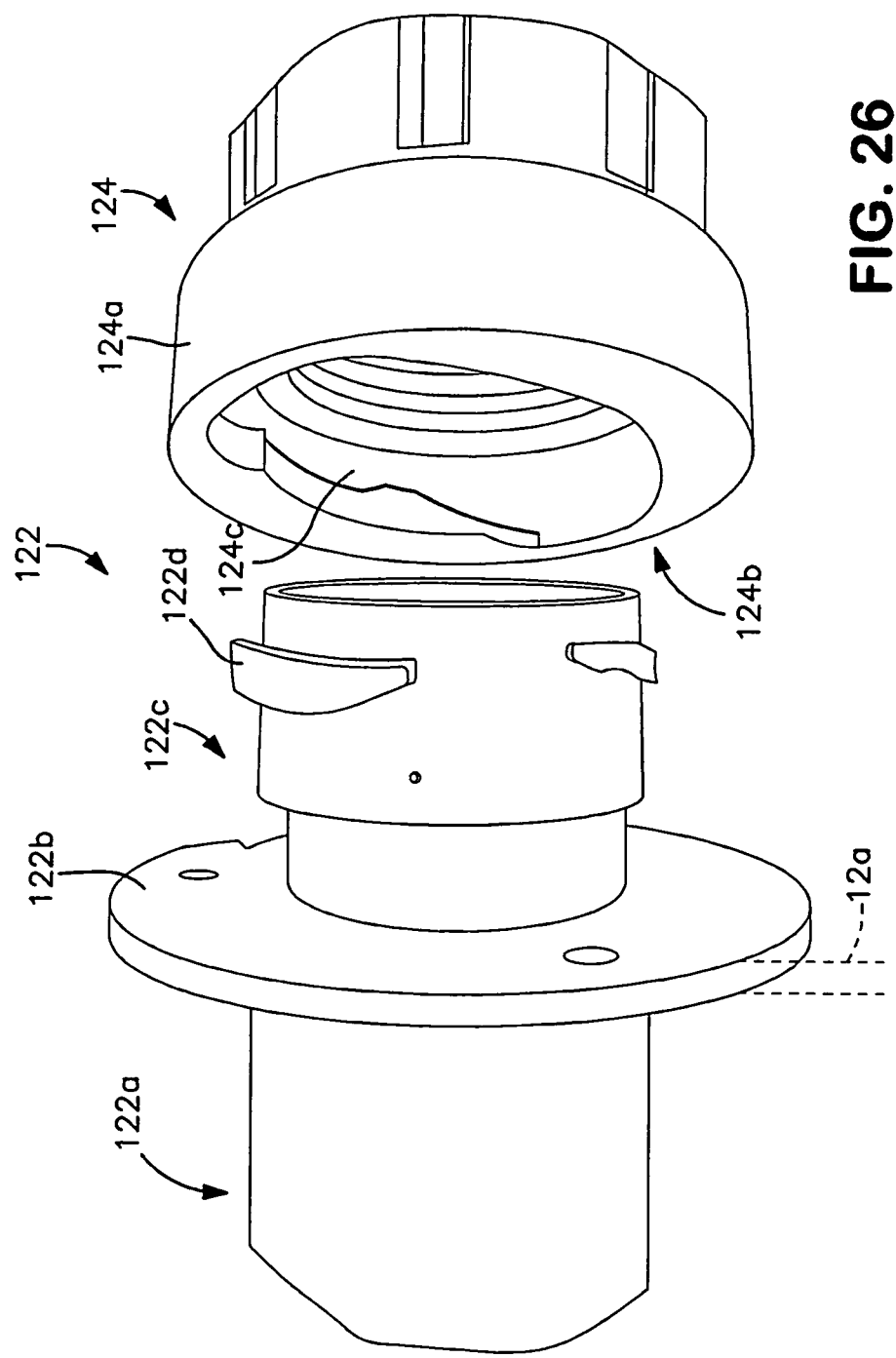

DRIVE SHAFT COUPLING HAVING SEALED INTERIOR PASSAGE FOR PRESSURIZED FLUID

BACKGROUND OF THE INVENTION

This invention relates to a coupling for connecting a rotating tube cleaning shaft to a tube cleaning machine where high pressure fluid is pumped through the coupling, where the coupling is sealed to contain the high pressure fluid, and where a machine driven rotary flexible shaft passes through the coupling.

The invention has particular application with machines for cleaning the interior of heat exchanger tubes to maintain operational efficiency. Rotating brushes or other tools and flushing water are used for this kind of tube cleaning. A common type of heat exchanger has a bundle of tubes fixed at opposite ends in headers. Typically, untreated cooling water flows through the interior of the tubes and exchanges heat with water or some other fluid on the outside of the tubes which is at a different temperature than the water flowing on the inside of the tubes. As is well known, if the water flowing through the tubes is dirty or untreated or inadequately treated for minimizing precipitation of minerals, a mineral deposit and dirt will gradually accumulate on the inside of the tubes. Accumulated mineral and dirt in the tubes is removed by means of a tube cleaning machine propelling a rotating brush or other cleaning tool through each tube to dislodge mineral and dirt, and carrying dislodged material away in a flow of pressurized cleaning water.

In a tube cleaning machine of this kind, a cleaning tool such as a brush is mounted at an end of a rotating shaft encased within a sheath, and cleaning fluid typically pressurized water passes through a sheath interior passage into the heat exchanger tube. Combined action of rotating tool and pressurized water accomplishes the desired tube cleaning in removing mineral deposits and dirt.

In this operational setting, there is need for a fluid tight drive shaft coupling for quickly and easily connecting the rotary shaft to the tube cleaning machine that provides rotary drive and pressurized water.

SUMMARY OF THE INVENTION

The present invention provides a tube cleaning machine housing mounting a drive motor for rotating a flexible tube cleaning shaft through a drive shaft coupling. The rotating tube cleaning shaft is manually connected to and driven through a coupling that passes through a machine housing side wall.

The coupling of the present invention comprises a driver manifold assembly forming part of the machine housing, and a driven shaft assembly forming part of the rotary cleaning shaft. The coupling provides for quick attachment and release of its component assemblies. The coupling is sealed to withstand high pressure fluid pumped through the coupling during a tube cleaning operation from the driver manifold assembly into the driven shaft assembly.

The driver manifold assembly is affixed at an opening through the outer casing of the tube cleaning machine and comprises an inner duct defining a fluid passage that extends through the casing opening, and cooperates with a concentric, outer latching collar. The latching collar and a retainer ring positioned on opposite sides of the casing opening cooperate in securing the inner duct in fixed position in the casing opening. The latching collar, in turn, receives, retains and seals a driven shaft assembly in pressurized water tight assembly.

The driven shaft assembly comprises a connecting collar secured to the near end of elongate rotary shaft assembly of yoke, sheath, flexible drive shaft, and cleaning tool. The sheath defines an interior passage for both the flexible drive shaft and pressurized water. The driven shaft assembly together with the rotary shaft assembly connects to the driver manifold assembly and is retained there by latching collar, forms a water tight seal with the inner duct, and positions a rotary drive shaft clutch at the near end of the flexible shaft for engagement with rotary drive head within the tube cleaning machine housing.

In use, when coupling of driver manifold assembly and driven shaft assembly is made, rotary motion is received by the flexible drive shaft, pressurized water flows through the coupling into the interior of the drive shaft sheath, and a tube cleaning tool such as a spiral wound brush attached to the far end of the drive shaft is ready for tube cleaning. An operator places the tool at a tube entrance and begins tube cleaning.

Specific examples are included in the following description for purposes of clarity, but various details can be changed within the scope of the present invention.

OBJECTS OF THE INVENTION

An object of the invention is to provide a coupling for quick and easy connection of a rotary tube cleaning shaft to a tube cleaning machine.

Another object of the invention is to provide a coupling for rotary shaft and pressurized water in a tube cleaning machine.

Another object of the invention is to provide a manually operated, quick connect and disconnect, coupling that receives and retains a rotary drive shaft and seals pressurized water flowing through the coupling.

Other and further objects of the invention will become apparent with an understanding of the following detailed description of the invention or upon employment of the invention.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which:

FIG. 1 is a side elevation view of a preferred embodiment of drive shaft coupling according to the invention illustrating uncoupled drive manifold assembly and driven shaft assembly.

FIG. 6 is a perspective view of uncoupled drive manifold assembly and driven shaft assembly of FIG. 1.

FIG. 7 is a perspective view of inner components of drive manifold assembly coupled with driven shaft assembly of the coupling of FIG. 1 showing relative positions of latch bars and their cooperating grooves.

FIG. 16 is a schematic view of internal passage of drive shaft coupling of FIG. 12 showing position of flexible drive shaft and fluid flow.

FIG. 17 is a side elevation view of drive shaft coupling of another preferred embodiment of the invention illustrating exterior layout of coupled drive manifold assembly and driven shaft assembly.

FIG. 18 is a perspective view of drive shaft coupling of FIG. 17 illustrating component action when drive manifold assembly and driven shaft assembly are uncoupled.

FIG. 19 is a perspective view of front face of drive manifold assembly of the coupling of FIG. 17 illustrating its receptacle cavity for receiving and sealing driven shaft assembly.

FIG. 20 is a side elevation view of the coupling of FIG. 17 illustrating driven shaft body surface that couples with receptacle of FIG. 19 and mounts driven shaft assembly sheath.

FIG. 22 is a schematic view of internal passage of drive shaft coupling of FIG. 17 showing position of flexible drive shaft and fluid flow.

FIG. 23 is a side elevation view of drive shaft coupling of another preferred embodiment of the invention illustrating exterior layout of coupled drive manifold assembly and driven shaft assembly.

FIG. 26 is a side elevation view of drive shaft coupling of another, preferred embodiment of the invention illustrating exterior layout for coupling drive manifold assembly and driven shaft assembly.

DETAILED DESCRIPTION OF THE PREFERRED EMBODIMENT

The drive shaft coupling of the invention is for use in tube cleaning machines made and sold by assignee of this application, particularly, RAM' tube cleaners having a power console or housing mounted on a hand truck. The console connects to the near end of an elongate flexible drive shaft for rotating a tube cleaning brush or tool mounted at the far end of the flexible shaft. A sheath encasing the drive shaft defines an interior channel for passage of cleaning fluid from the power console to the brush end of the sheath. In a tube cleaning pass, the rotating tool and cleaning fluid advance through a tube interior to remove and flush away dirt and encrusted mineral.

Figure 8:
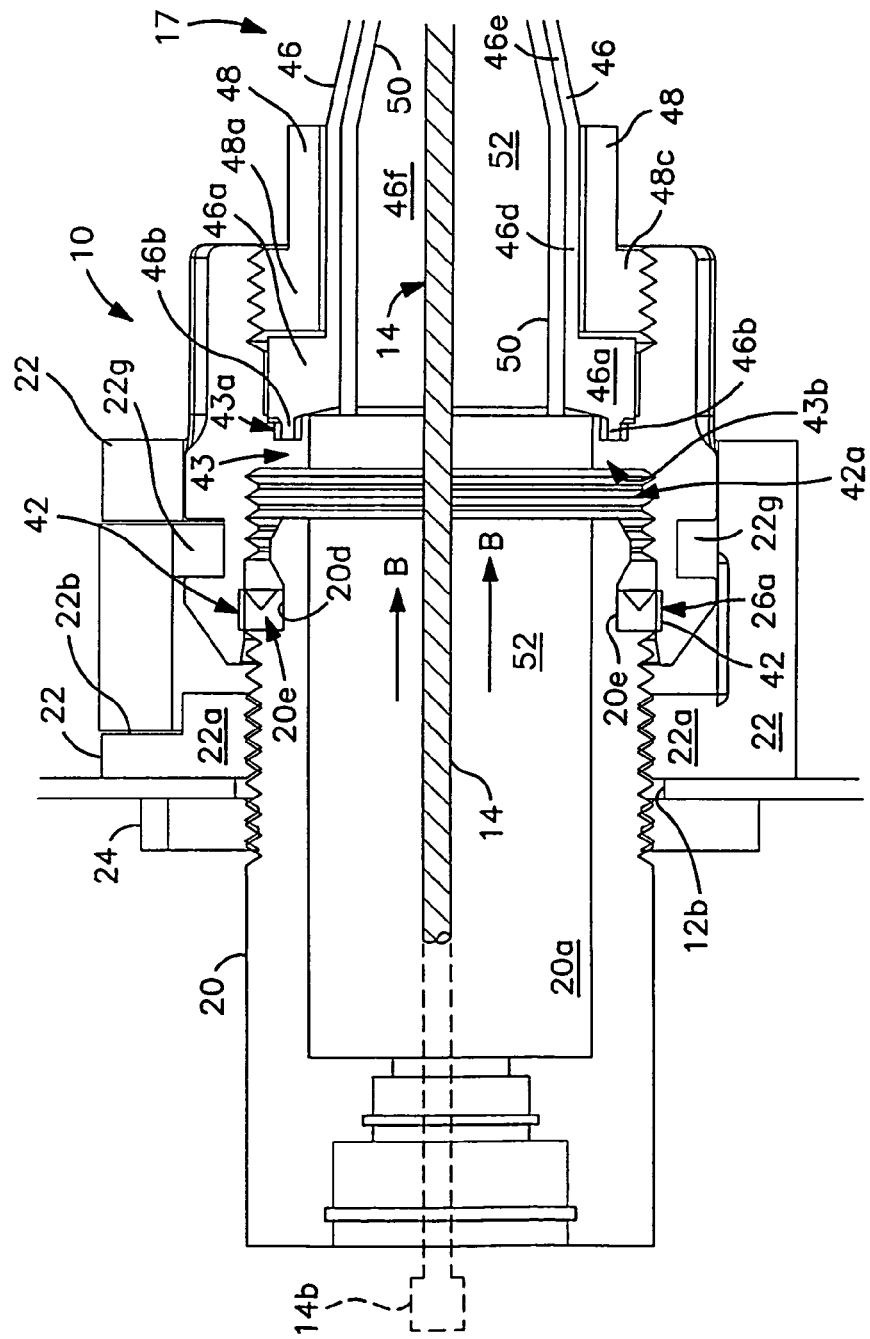
FIG. 8 is a side elevation view in section of drive shaft coupling of FIG. 1 illustrating interior layout of coupled drive manifold assembly and driven shaft assembly, together with tube cleaning subassembly of flexible drive shaft, yoke, and sheath in place.
Figure 11:
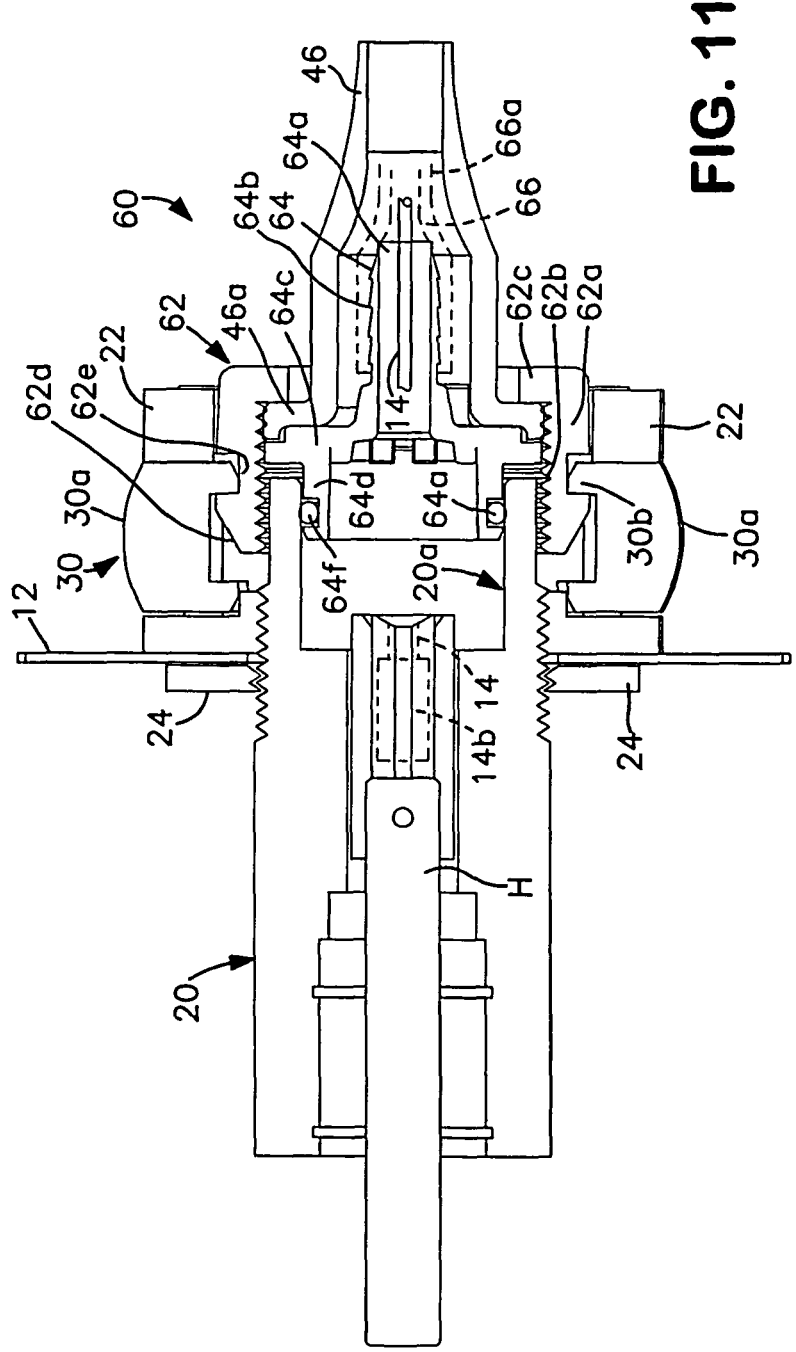
FIG. 11 is a side elevation view in section of drive shaft coupling of another preferred embodiment of the invention illustrating interior layout of coupled drive manifold assembly and driven shaft assembly, together with tube cleaning subassembly of flexible drive shaft, yoke, sheath in place and fluid tight sealing arrangement.
Figure 12:
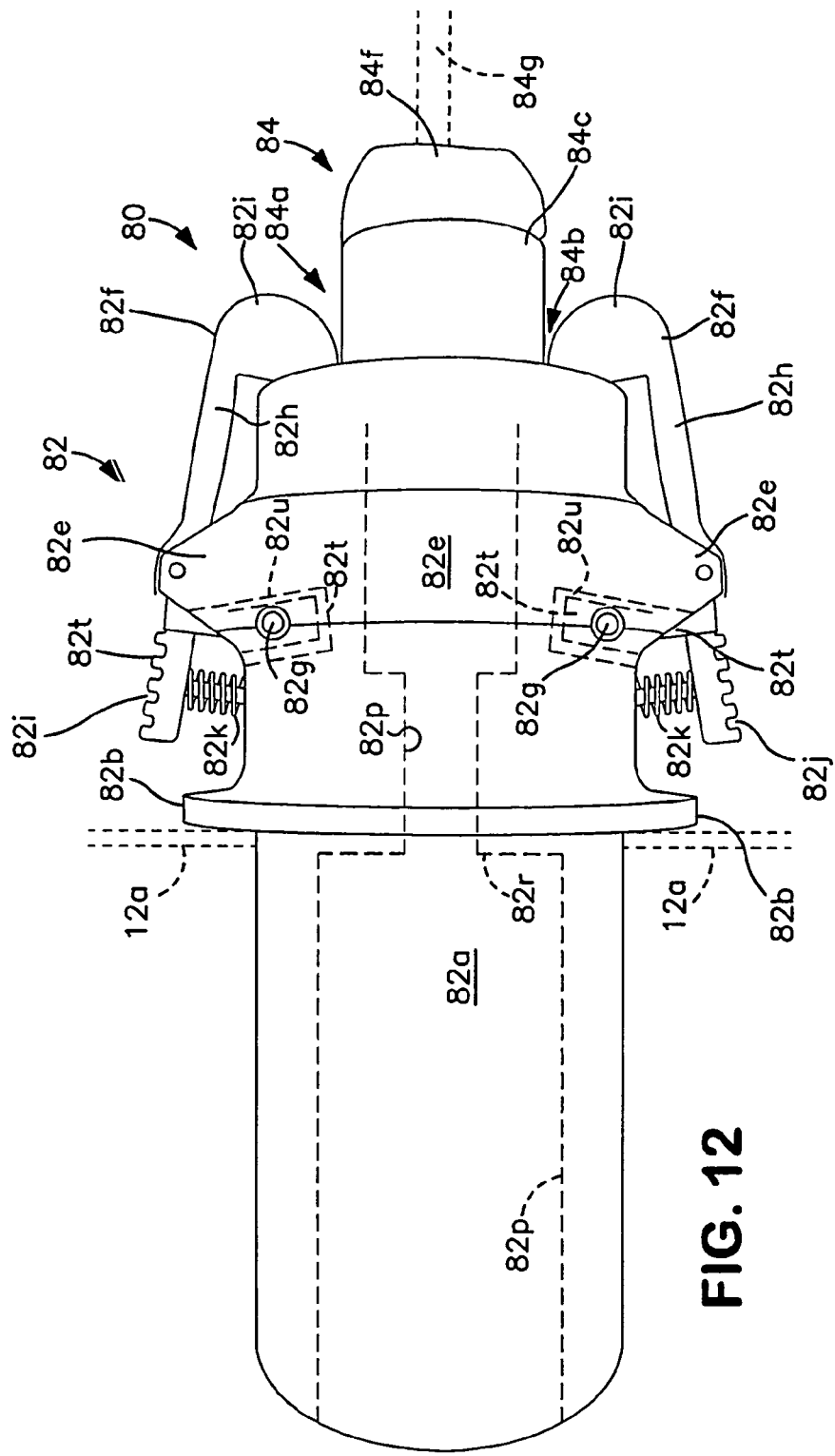
FIG. 12 is a side elevation view of drive shaft coupling of another preferred embodiment of the invention illustrating exterior layout of coupled drive manifold assembly and driven shaft assembly.
Figure 13:
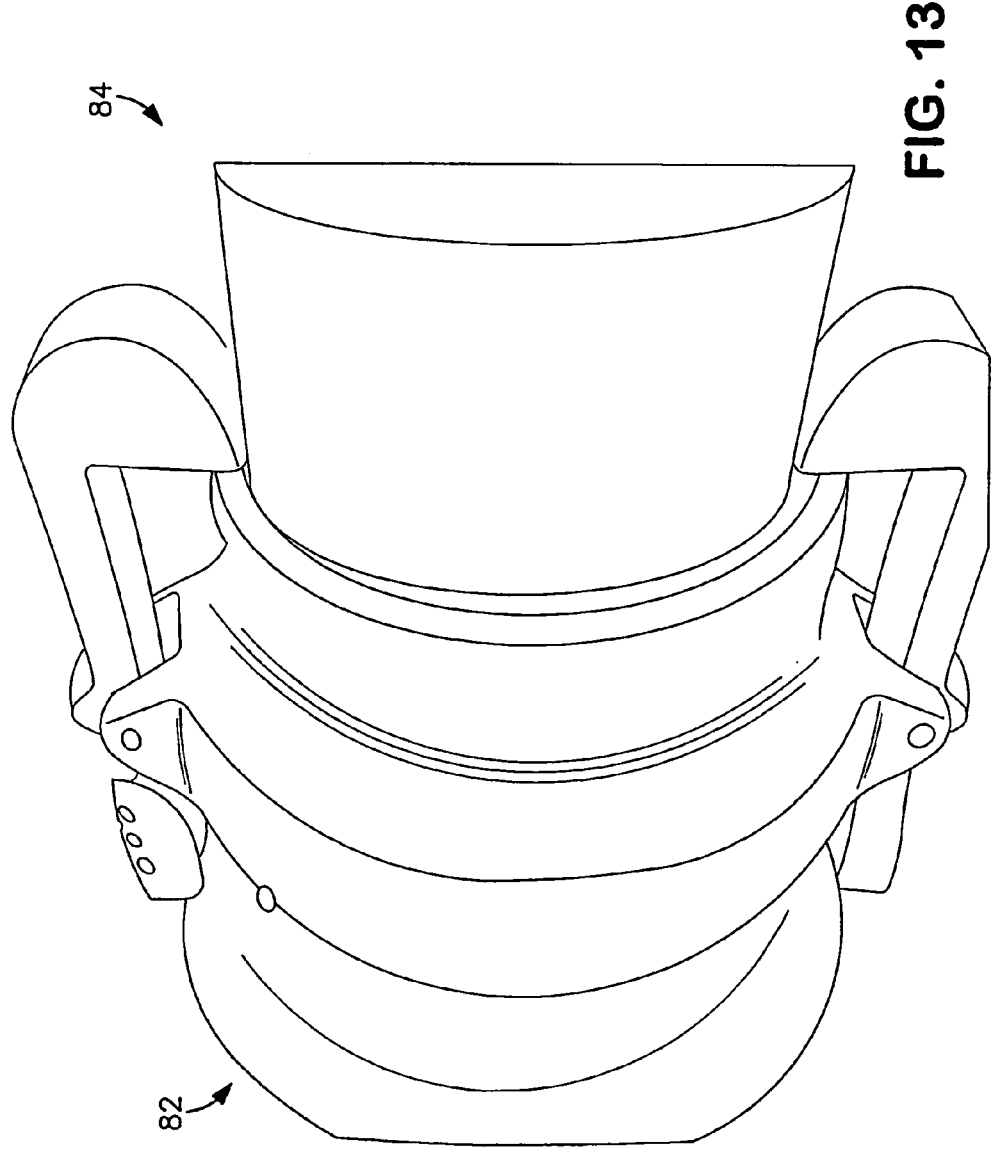
FIG. 13 is a perspective view of drive shaft coupling of FIG. 12 illustrating component action when drive manifold assembly and driven shaft assembly are coupled.
Figure 14:
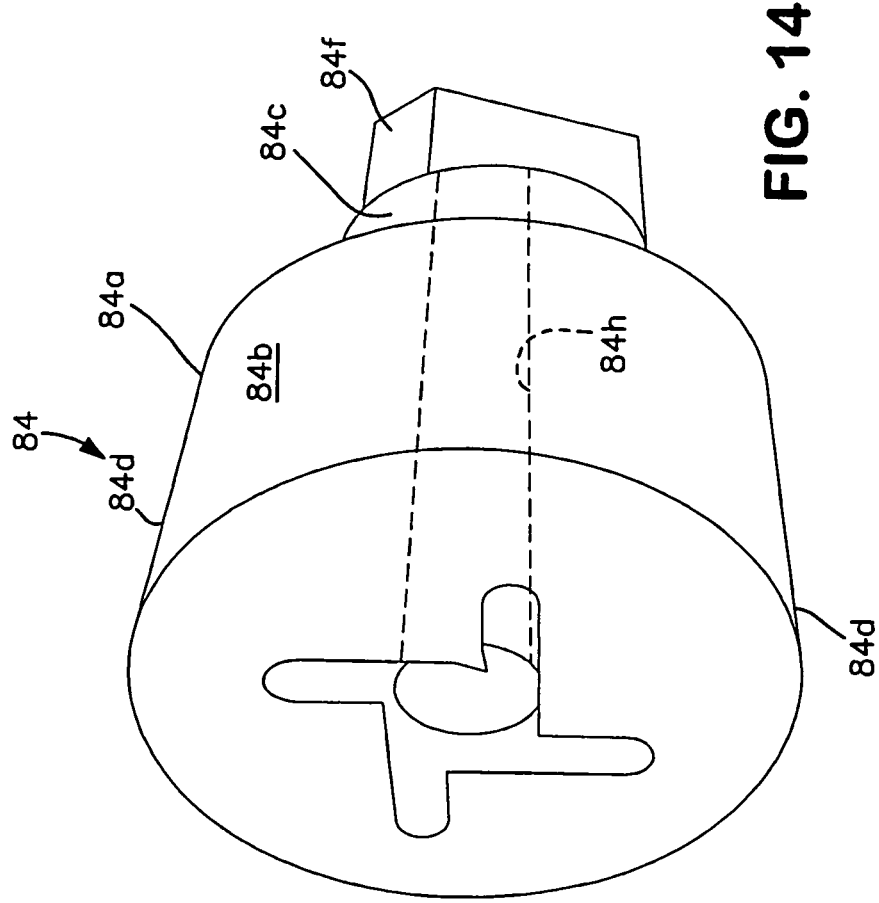
FIG. 14 is a perspective view of front face of driven shaft assembly of the coupling of FIG. 12.

Referring to FIG. 1 of the drawing, the shaft quick connect coupling 10 of the invention is mounted on a tube cleaning machine housing 12 having a drive motor with drive clutch (not shown) for rotating a tube cleaning shaft 14 by shaft drive bar 14$b$ (FIGS. 8 and 11). The tube cleaning shaft is part of a drive shaft assembly and is driven through coupling 10 that passes through machine housing side wall 12$a$.

The coupling of the present invention comprises a driver manifold assembly 16 attached to the machine housing 12, and a driven shaft assembly 18 attached to the cleaning shaft assembly comprising yoke, sheath, flexible drive shaft, and cleaning tool. The coupling provides for quick attachment and release of its component assemblies. The coupling is sealed to withstand high pressure fluid pumped from the tube cleaning machine through the driver manifold assembly into the driven shaft assembly during a tube cleaning operation.

The driver manifold assembly 16 is affixed at an opening through the outer casing of the tube cleaning machine and comprises an inner duct 20 (FIGS. 2, 3) defining a common passage 20$a$ through the casing opening for pressurized tube cleaning fluid, and for passage of rotary drive shaft 14 (FIGS. 1 and 8) for connection to console drive motor (not shown). The inner duct is centered and secured in casing opening 12$b$ by the action of concentric outer latching collar 22 and retaining ring 24. The duct 20 is threaded 20$b$ along its outer surface for positioning retaining ring 24 against casing wall 12$a$ around opening 12$b$. The duct near its open end 20$c$ is provided with an annular groove 20$d$ for positioning a seal 20$e$ such as an O-ring or U-cup. The seal engages a sealing surface 42 (FIGS. 3, 4, and 8) of the driven shaft assembly as described below. The latching collar 22 is provided with inwardly directed flange 22$a$ threaded onto duct 20 for tightening the manifold assembly to the casing wall.

Figure 3:
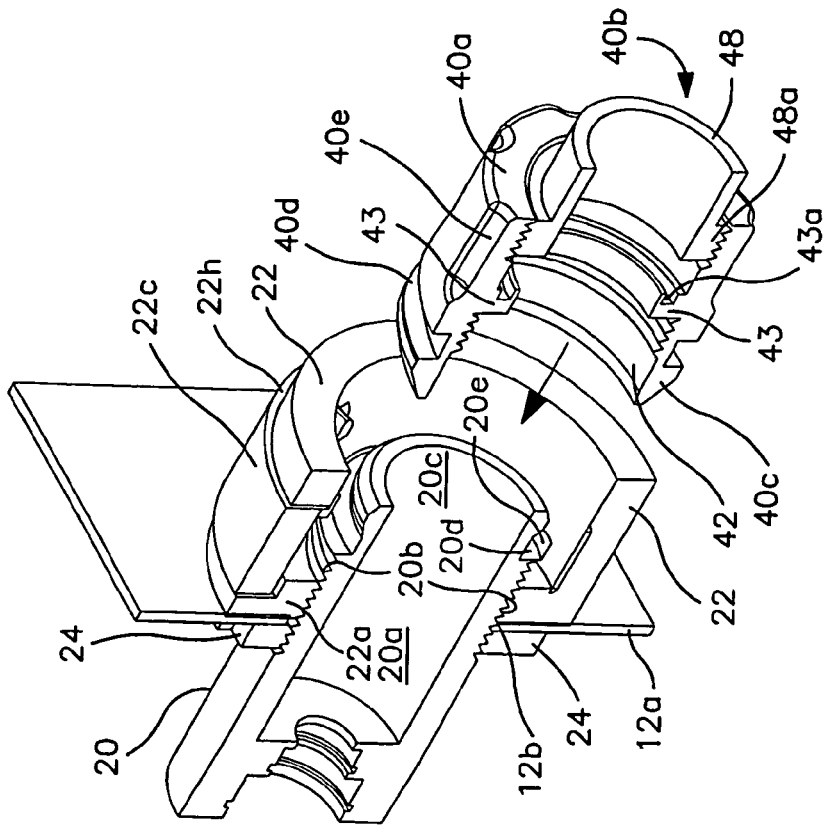
FIG. 3 is a perspective view in section of uncoupled drive manifold assembly and driven shaft assembly of the coupling of FIG. 1.
Figure 2:
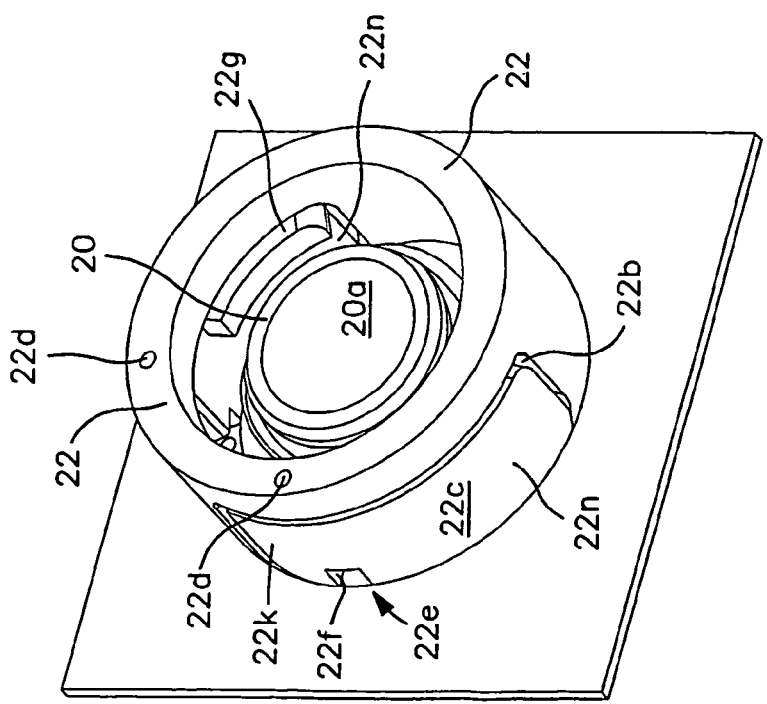
FIG. 2 is a perspective view of the drive manifold assembly of FIG. 1 showing position of latch arm and latch bar.
Figures 4, 5:
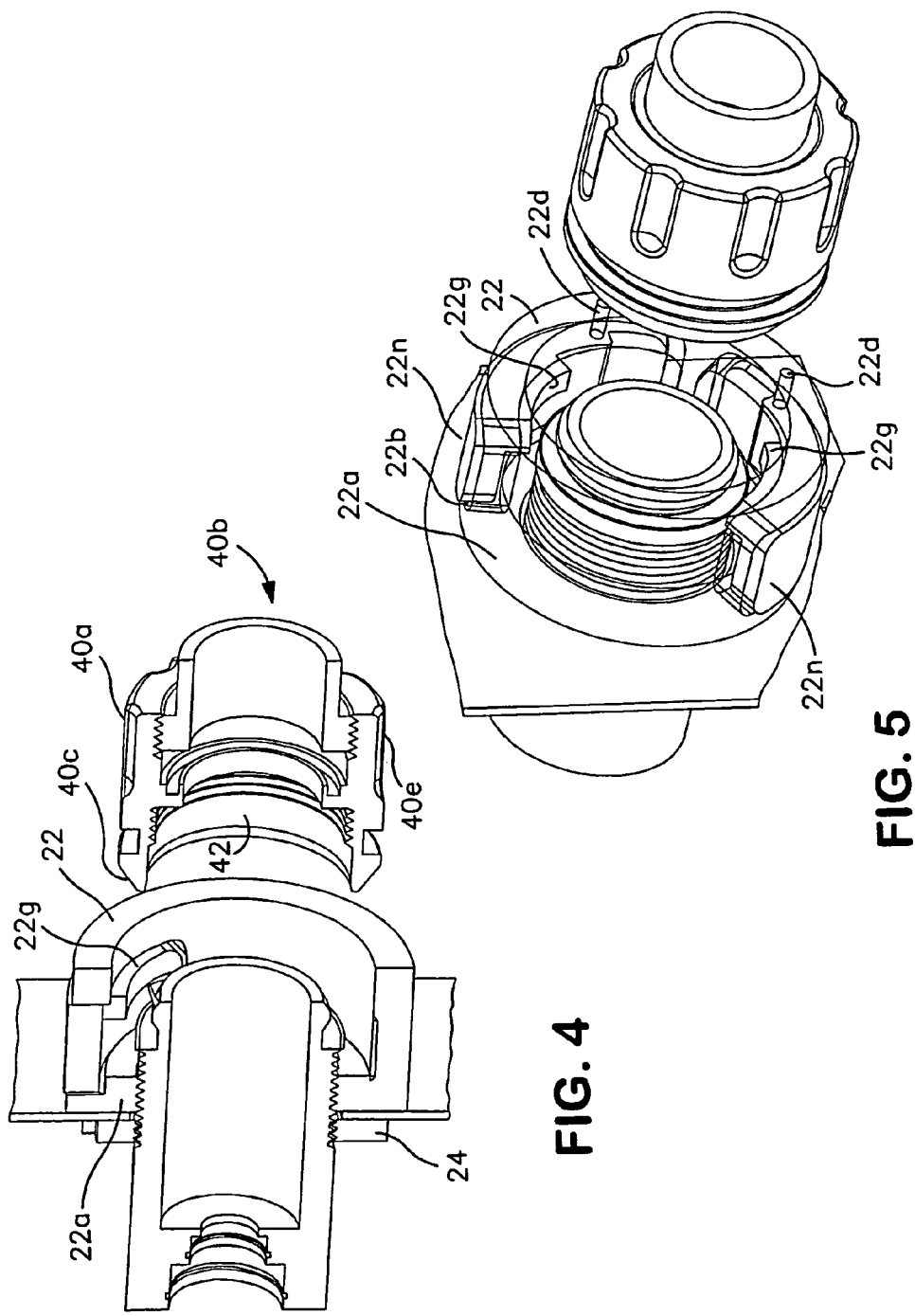
FIG. 4 is another perspective view in section of uncoupled drive manifold assembly and driven shaft assembly of the coupling of FIG. 1.
FIG. 5 is a perspective view of uncoupled drive manifold assembly in section along with driven shaft assembly of the coupling of FIG. 1 showing latch arm position opposite to that of FIGS. 3 and 4.

Referring to FIGS. 1-4, 5, and 7 latching collar 22 comprises a cylindrical body with flange 22$a$ and with wall openings 22$b$ accommodating arcuate latch arms 22$c$. Latch arms are set into the openings and held there by pivot pins 22$d$ and controlled by torsion springs 22$e$ located in latch arm recesses 22$f$. The inner surface of each latch arm 22$c$ has an inwardly directed latch bar 22$g$ for holding driver manifold assembly 16 and driven shaft assembly 18 together as described in detail below. As seen in FIGS. 2, 4, 5, 7, and 8, latch bar is offset to lie along side edge 22$h$ of its latch arm. Latch arms have normal position as shown in FIG. 2 wherein torsion springs urge arm with bar into closed position. Latch arms are moved to open position for release of driven shaft assembly by manually pushing the inner end 22$k$ of the arm to pivot on pin 22$d$ against spring force so as to pivot latch bars outwardly for disengagement with driven shaft assembly (FIG. 5). As shown in FIGS. 2 and 6 each latch arm 22$c$ is mounted for pivoting movement on pin 22$d$ passing through latching collar wall 22 and latching arm 22$c$ situated in wall openings 22b. The pin location is offset to provide a fulcrum near one end 22k of the arm so that the other end 22n of the arm has a greater range of movement about the pin for pivoting latch bars 22g outward to disengage from driven shaft assembly. Accordingly, latch bars 22g (FIG. 2) are at the other end 22n of their arms 22c. A torsion spring 22e encircling the pivot pin in latch arm recess 22f urges its arm into closed position of FIGS. 1 and 2.

Figure 9:
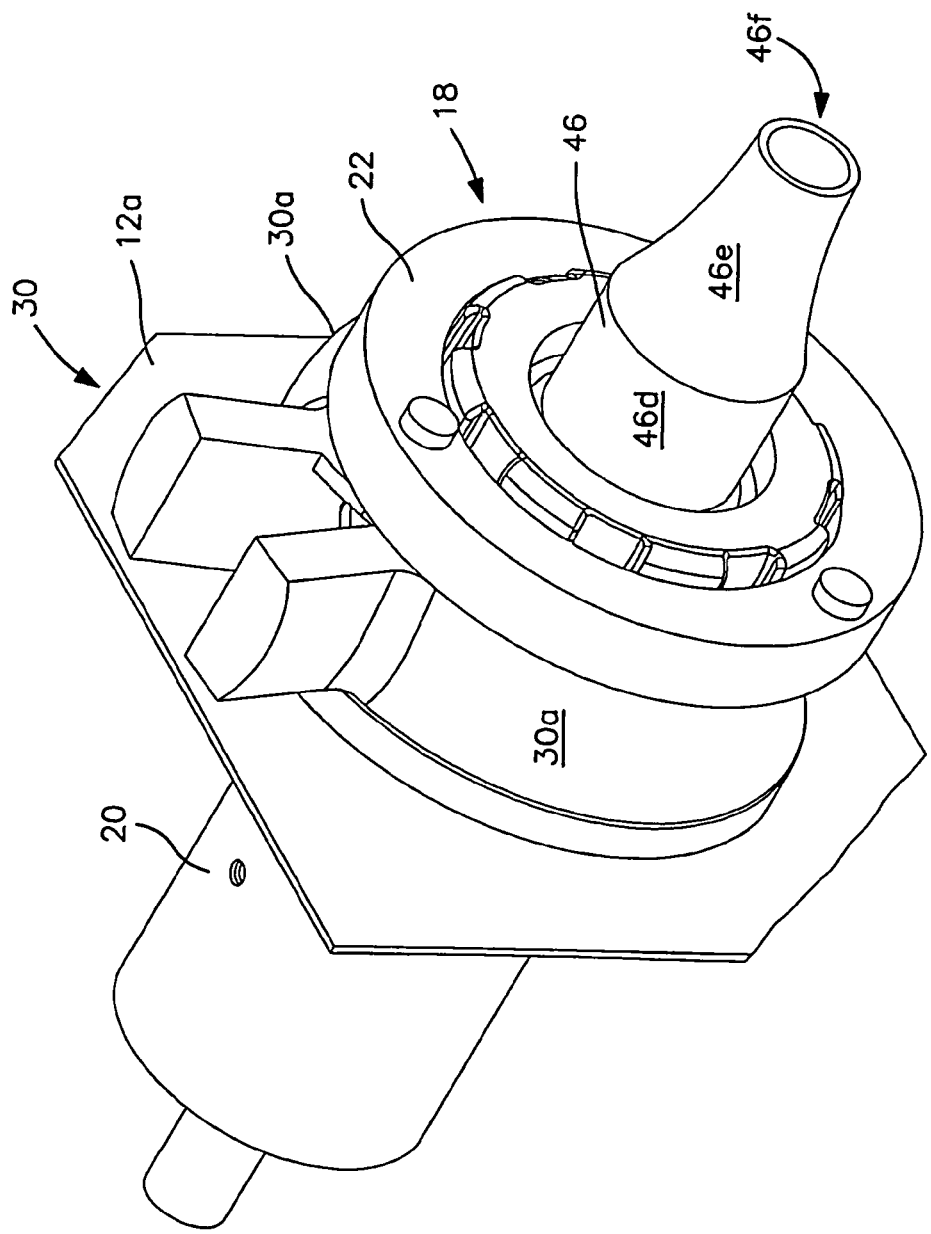
FIG. 9 is a perspective view of another preferred embodiment of drive shaft coupling according to the invention illustrating coupled drive manifold assembly and driven shaft assembly.
Figure 10:
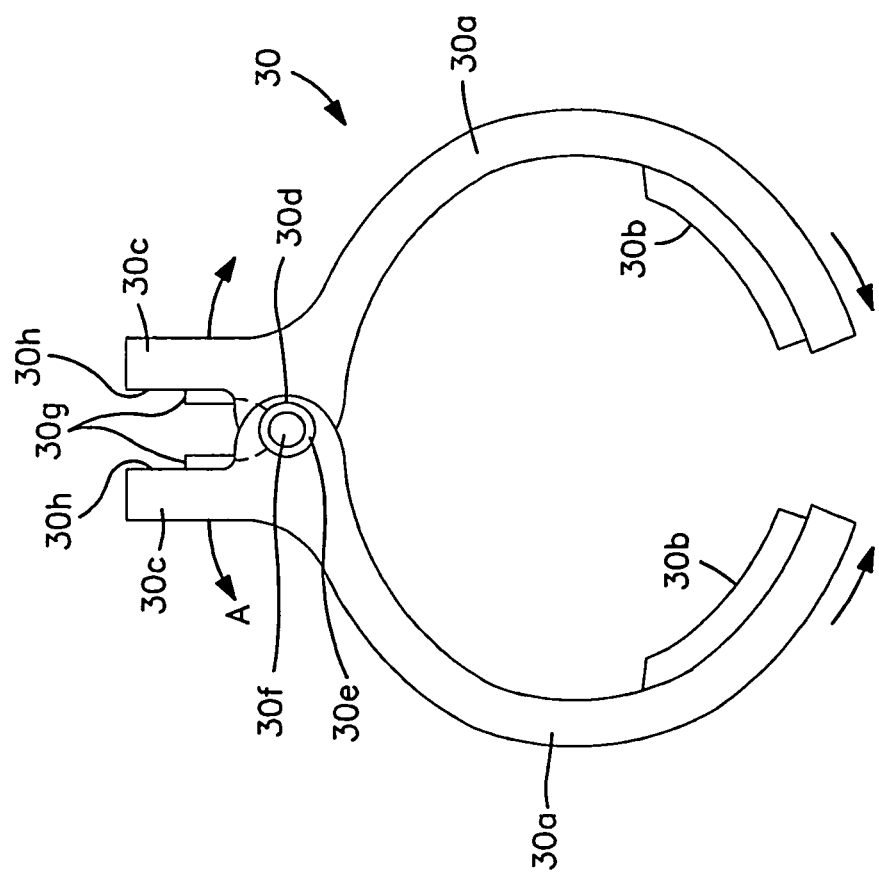
FIG. 10 is a front elevation of latch arm subassembly of another preferred embodiment for driver manifold assembly according to the invention.

Another preferred embodiment of driver manifold assembly latch arms is shown in FIGS. 9 and 10 where common reference numerals indicate the same components as described with the embodiment of FIGS. 1-8. This embodiment has latch arms 30 with a movement similar to that of ice tongs. Each arm 30a is arcuate with a latch bar 30b formed on its inner surface for engaging the driven shaft collar 18 described below. Each arm has an integral actuating tab 30c with tabs acting together in moving the latch arms 30a. Each arm has an integral eyelet 30d such that aligned eyelets receive an assembly sleeve 30e and pivot pin 30f. A torsion spring 30g is centered on the pivot pin and has biasing fingers bearing on inner surfaces of the tabs urging the latch mechanism in the direction of arrows A (FIG. 10) to normal position for securing driver manifold assembly to driven shaft assembly.

The driver manifold assembly receives, retains and seals the driven shaft assembly 18 with attached drive shaft assembly in pressurized water tight assembly.

As shown in FIGS. 1, 3, and 4 the driven shaft assembly 18 comprises a driven shaft collar 40 defined by generally cylindrical body 40a with interior passage 40b. The collar has angled front surface 40c and an adjacent annular groove 40d. As the driven collar is inserted into the latch collar, the angled surface lifts and guides the latch bars 22g into locked operating position in annular groove 40d where they are held in place by latch arm springs 22e. The shaft collar body 40a includes a set of finger-shaped recesses 40e to aid gripping the collar for insertion into the latch collar.

The drive collar interior surface (FIGS. 3, 4, and 8) includes a smooth annular sealing surface 42 for forming a water tight seal against inner duct sealing element 20d when driven collar and latch collar are locked in operating position. If desired, a section of interior surface adjacent the sealing surface may be threaded 42a to accommodate use of the driven collar with legacy tube cleaning machines already in commercial use.

An interior annular rib 43 normal to collar axis extends radially inward from interior surface and presents a rearward facing annular channel 43a that receives and holds drive shaft yoke 46 seen in FIGS. 8 and 9. A tubular bushing 48 with threaded flange 48a fits into the back end of the drive collar for engaging outer flange 46a of the yoke and securing it by rib 46b in position in annular channel 43a. The front face 43b of annular rib is a sealing surface for pressurized water when used with a machine already in commerce.

Referring to FIGS. 8 and 9, yoke 46 comprises an elongate tubular body of integral cylindrical 46d and conical 46e sections and an interior passage 46f for drive shaft 14 and its sheath 50. A flange 46a at the yoke front end includes an annular rim 46b that fits into annular channel 43a. A water tight seal is established between rim and channel by advancing bushing flange 48a into wrench tight engagement with yoke flange 46a.

A tube cleaning drive shaft assembly 17 shown in FIG. 8 includes yoke 46 sealed at inner surface to sheath 50 together with wound steel flexible shaft 14 with drive clutch 14b passing through yoke and sheath for receiving rotation from tube cleaning machine drive motor.

Inner duct 20a and sheath define an interior enclosed channel 52 for flow of pressurized cleaning fluid (arrow B) typically water from the tube cleaning machine through the sheath exiting its far end at cleaning tool connection. The duct and shaft collar have a watertight seal formed by engagement of O-ring 20e and seal surface 42. The combination of pressurized fluid and rotating cleaning element accomplishes tube cleaning. The cleaning fluid may be pressurized by pump within the tube cleaning machine.

FIG. 11 illustrates another preferred embodiment of the invention having components in common with the embodiments of FIGS. 1-10 that are identified by common reference numerals.

As shown in FIG. 11, the driven shaft assembly 60 comprises a driven shaft collar 62 defined by generally cylindrical body 62a with threaded interior passage 62b, and inwardly directed end flange 62c. The collar has angled front surface 62d and an adjacent annular groove 62e. As the driven collar is inserted into the latch collar 30, the angled surface lifts and guides the latch bars 30bg into locked operating position in annular groove 62e where they are held in place by latch arm springs. The shaft collar outer surface may include a set of finger-shaped recesses (not seen in FIG. 11) but similar to those of FIGS. 1-8 to aid gripping the collar for insertion into the latch collar.

If desired, a section of interior surface adjacent the sealing surface may be threaded 62b to accommodate use of the driven collar with legacy tube cleaning machines already in commercial use.

The driven shaft assembly 60 also comprises a barbed insert 64 having a central tubular section 64a with barbed outer surface 64b for mounting and securing a sheath 66 with interior channel 66a through which flexible shaft 14 and pressurized fluid pass in a tube cleaning operation. The barbed insert further has a radial flange 64c for nesting relation with collar 62 in such a manner as to secure yoke 46 by upturned flange 46a within collar 62.

The barbed insert further includes a cylindrical sealing embossment 64d with O-ring groove 64e extending axially from radial flange 64c. O-ring 64f forms a fluid pressure tight joint between driven shaft assembly 60 and inner surface 20a of inner duct 20.

Inner duct 20a and sheath 66 define an interior enclosed channel for flow of pressurized cleaning fluid typically water from the tube cleaning machine through the sheath exiting its far end at cleaning tool connection. The duct and shaft collar have a watertight seal formed by engagement of O-ring 64f and seal surface 20a. The combination of pressurized fluid and rotating cleaning element accomplishes tube cleaning.

In assembling the driver manifold assembly and the driven shaft assembly of FIG. 11, the driven shaft collar 62 together with yoke 46, sheath 66, and rotary drive shaft 14 are inserted into the latch collar 30. Shaft collar front angled surface 62d engages latch bars and lifts latch arms about their pivot point for registering latch bars 30b in shaft collar groove 62e for securing the coupling.

As shown in FIG. 11, flexible drive shaft 14 with drive bar 14b engages drive head H rotated by the machine drive motor.

FIGS. 12-16 show another preferred embodiment of the invention that comprises drive shaft coupling 80 including drive manifold assembly 82 and driven shaft assembly 84.

Drive manifold assembly 82 comprises generally cylindrical housing 82a with circumferential flange 82b for securing coupling to tube cleaning machine side wall 12a, and exterior embossments 82c and 82d with spaced radial flanges 82e for mounting cooperating latches 82f that hold driven shaft assembly 84 in place in connected coupling. Embossments 82c-d have ends turned radially defining spaced flanges 82e that guide and confine latches 82f as they rotate on pivot pins 82g. Pins 82g pass through embossments and housing body wall and through a latch post 82t (FIG. 12) extending into housing recess 82u that provides a pivot connection for its latch. Each latch comprises a main body portion 82h with latch hook 82i at one end, and finger plate 82j at other end for pivoting latch on pivot pin against compression spring 82k. The spring urges latches to closed position seen in FIG. 12. Each latch hook has a curved head 82m by which the latches are cammed out of the way (FIG. 13) as the driven shaft assembly 84 is coupled to the drive manifold assembly. For disassembling the coupling the operator squeezes finger plates 82j together releasing the latches so that driven shaft assembly can be pulled out of the manifold assembly.

The embodiments of coupling disclosed herein may be regarded as sprung latch couplings in view of the latches themselves being moved or sprung out of the way by the driven shaft assembly as the coupling is being connected and then returning to operative latching position when the coupling is completed.

Figure 15:
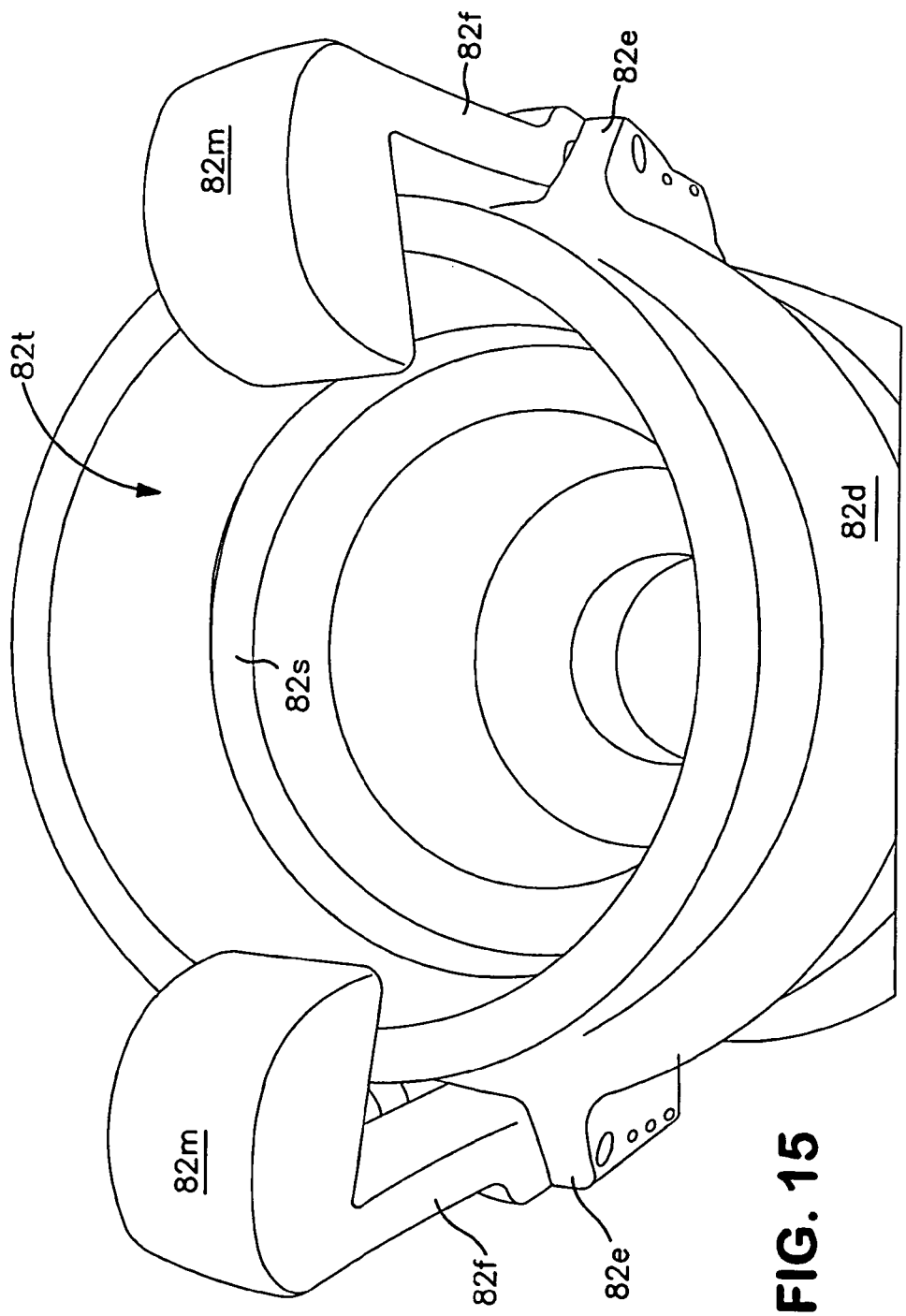
FIG. 15 is a perspective view of the coupling of FIG. 12 illustrating drive manifold interior that receives and seals driven shaft assembly.

Cylindrical housing 82a has an internal bore 82p (FIGS. 12, 16) for passage of tube cleaning machine tube cleaning fluid and rotating flexible drive shaft 14, with sealing wall 82r and driven assembly fluid seal 82s within driven shaft receptacle 82t (FIG. 15).

The driven shaft assembly 84 (FIGS. 14, 16) comprises a driven shaft collar 84a defined by generally cylindrical first body 84b of outer diameter matching inner diameter of receptacle 82t and a second body 84c of lesser diameter. First body sealing surface 84d forms a seal against fluid seal 82s in the assembled coupling. A threaded section 84e receives a retaining cap 84f for holding sheath 84g to the driven shaft assembly.

As shown in FIG. 16, an interior passage 80a passes entirely through the drive manifold assembly and driven shaft assembly (bore 84h) entering the internal passage 84i of the sheath. Tube cleaning fluid (arrow B) and the rotating flexible drive 14 shaft pass from the tube cleaning machine through drive manifold assembly and driven shaft assembly for tube cleaning operations.

FIGS. 17-22 show another preferred embodiment of the invention comprises drive shaft coupling 90 including drive manifold assembly 92 and driven shaft assembly 94.

Drive manifold assembly 92 comprises generally cylindrical housing 92a with circumferential flange 92b for securing coupling to tube cleaning machine side wall 12a. Housing section 92c to the right of flange 92b as seen in FIGS. 17 and 18 mounts a spring biased, sliding latch 92d of knurled cylinder telescoped over section 92c. As seen in FIG. 19, section wall 92e has radial bores 92f accommodating a set captive balls 92g that project into section socket 92h when sliding latch 92d is in the position of FIG. 17 for holding driven shaft assembly 94 in place in the connected coupling. By moving sliding latch in direction of arrow D in FIG. 18, captive balls are freed to move radially in bores 92f and the driven shaft assembly 94 can be inserted into or pulled out of socket 92h to connect or disconnect the coupling.

Figure 21:
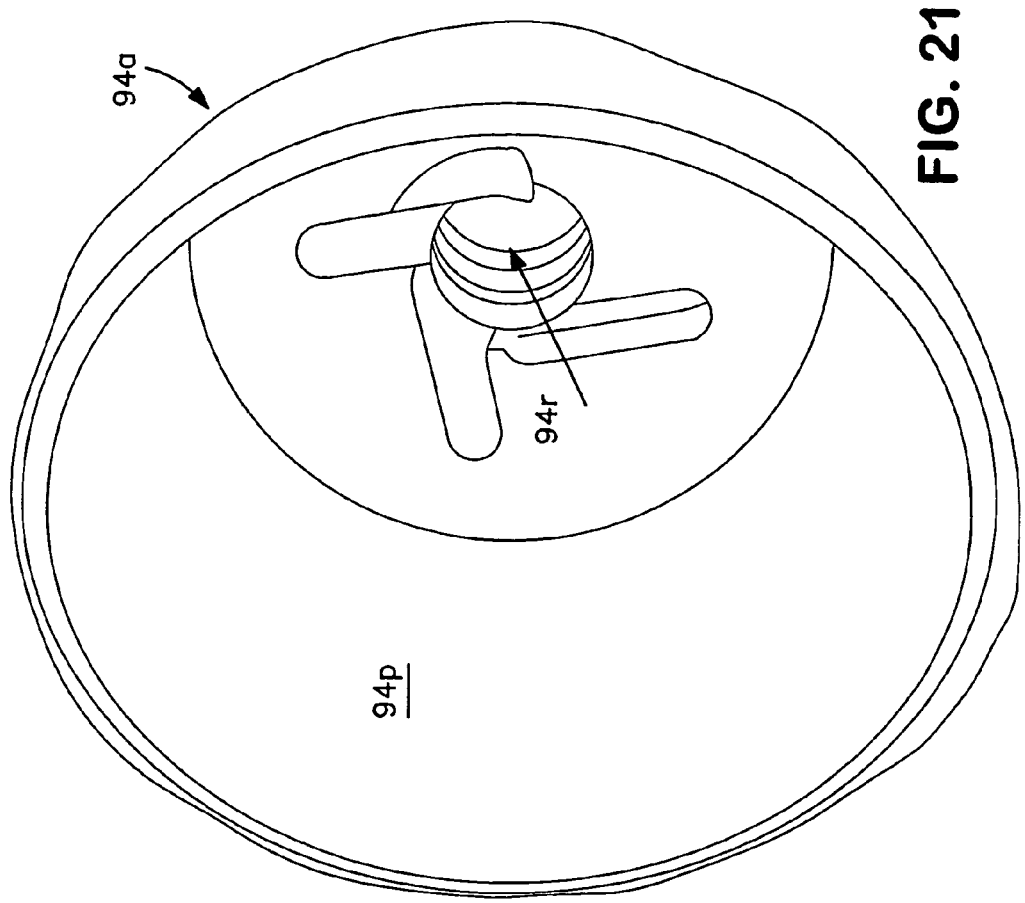
FIG. 21 is a perspective view of front face of driven shaft assembly of the coupling of FIG. 21.

For its part, driven shaft assembly 94 (FIGS. 20, 21) comprises an integral cylinder 94a in sections greater 94b and lesser 94c diameters. A sheath 96 (FIGS. 17, 22) with interior passage 96a for tube cleaning fluid (arrow B) and rotary, flexible drive shaft 14 is connected by retaining cap 96b to assembly section 94c. The outer surface 94d of greater section 94b has a circumferential groove 94e that cooperates with captive balls 92g for latching and unlatching drive manifold assembly and driven shaft assembly. As shown in FIG. 21, cylinder 94a includes plenum 94p for receiving tube cleaning fluid through the coupling and directing it through bore 94r into the sheath.

Socket 92h (FIG. 19) is provided with a sealing ring 92i that forms a seal against the adjacent end 94k (FIG. 20) of cylinder 94a to confine tube cleaning fluid within the connected coupling.

As shown in FIG. 22, an interior passage 98 passes entirely through the drive manifold assembly and driven shaft assembly 94r entering internal passage 96a in sheath 96. Tube cleaning fluid (arrow B) and the rotating flexible drive 14 shaft pass from the tube cleaning machine through drive manifold assembly and driven shaft assembly and through the sheath for tube cleaning operations.

Figure 24:
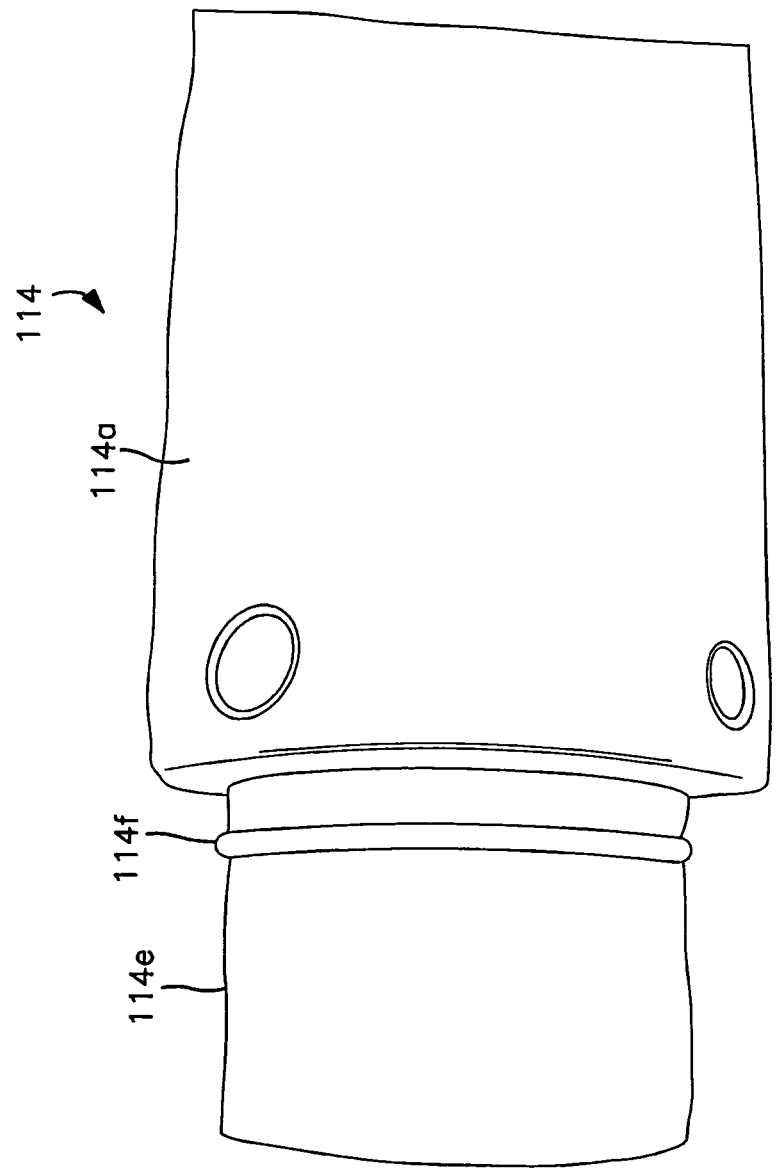
FIG. 24 is a perspective view of driven shaft assembly of FIG. 23.
Figure 25:
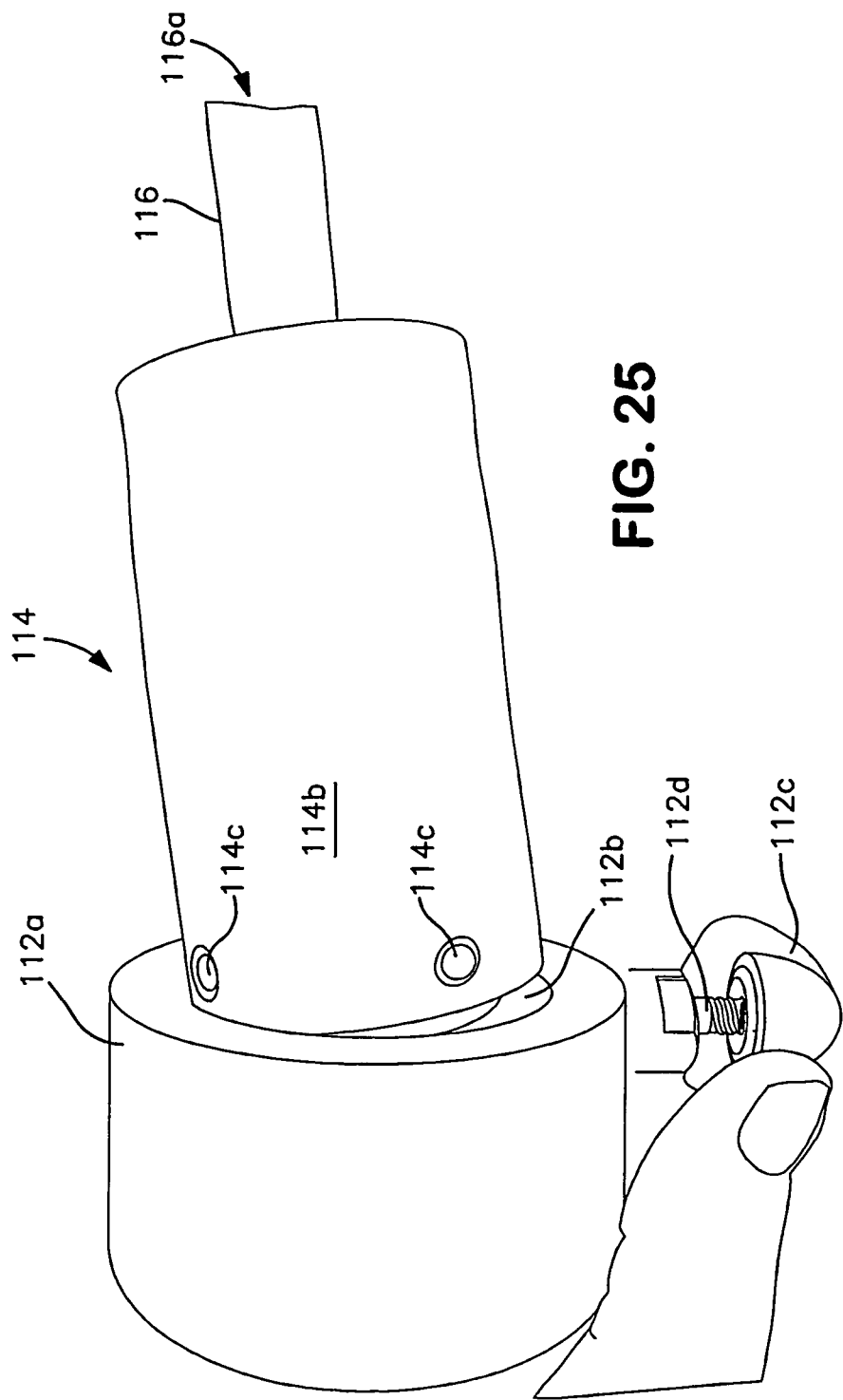
FIG. 25 is a perspective view of the manner of assembling the coupling of FIG. 23.

FIGS. 23-25 show another preferred embodiment of the invention comprises drive shaft coupling 110 including drive manifold assembly 112 and driven shaft assembly 114.

Drive manifold assembly 112 comprises generally cylindrical housing 112a secured to tube cleaning machine side wall 12a, and having a socket 112b for receiving driven shaft assembly 114. Housing 112a as seen in FIGS. 23 and 25 mounts a retaining latch 112c that projects retaining pin 112d into the socket for registry with and retention of driven shaft assembly in connected coupling.

For its part, driven shaft assembly 114 comprises cylinder 114a and sheath 116 (FIG. 25) with interior passage 116a for tube cleaning fluid (arrow B) and rotary, flexible drive shaft 14. The outer surface 114b of the cylinder has a plurality of receptor sockets 114c for retaining pin 112d so as to hold coupling components together. The pin engages one of the pin sockets such that a plurality of circumferentially spaced sockets facilitates quickly connecting the components.

The cylindrical housing 114 has a necked down sealing section 114e with sealing ring 114f to provide fluid tight seal for the assembled coupling.

In a manner similar to that of FIGS. 16 and 22, an interior passage extends entirely through the drive manifold assembly and driven shaft assembly entering internal passage in sheath 116. Tube cleaning fluid and the rotating flexible drive shaft pass from the tube cleaning machine through drive manifold assembly and driven shaft assembly and through the sheath for tube cleaning operations.

FIG. 26 shows another preferred embodiment of the invention comprises drive shaft coupling 120 including drive manifold assembly 122 and driven shaft assembly 124.

Drive manifold assembly 122 comprises generally cylindrical housing 122a with circumferential flange 122b for securing coupling to tube cleaning machine side wall 12a. Housing section 122c to the right of flange 122b as seen in FIG. 26 is fitted with a bayonet connection 122d for receiving the driven shaft assembly 124.

Driven shaft assembly 124 comprises cylinder 124a with interior passage 126a for tube cleaning fluid and rotary, flexible drive shaft. The inner surface 124b of the cylinder has a plurality of bayonet sockets 124c to hold coupling components together and which facilitates quickly connecting the components.

The interior passage of coupling 120 for tube cleaning fluid, rotary, flexible tube cleaning shaft and coupling fluid seal may be arranged as for embodiments of the invention described above.

In use, when the coupling is made, rotary motion is received by the rotary drive shaft, pressurized water flows through the coupling into the interior of the drive shaft sheath, and a tube cleaning tool such as a spiral wound brush is attached to the far end of the drive shaft. An operator places the tool at a tube entrance and begins tube cleaning.

Various changes may be made to the structure embodying the principles of the invention. The foregoing embodiments are set forth in an illustrative and not in a limiting sense. The scope of the invention is defined by the claims appended hereto.

We claim:

1. A coupling for a tube cleaning machine having a drive motor for rotating a tube cleaning shaft, the coupling comprising:

a tube cleaning shaft, cleaning fluid, a sheath encasing the shaft and defining a channel for flow of the cleaning fluid, an inner duct attached to the machine, the duct having an interior passage, the tube cleaning shaft and cleaning fluid passing through the duct, a latch collar through which the inner duct passes, the latch collar having at least one latch arm mounted for movement in an opening in the latch collar, a latch bar integral with the latch arm, the latch arm is pivotally mounted, on an offset pivot pin, in the latch collar opening for radial movement between open and closed positions, and the latch being spring biased to a closed position, a shaft collar for connecting the tube cleaning shaft to the tube cleaning machine through the latch collar, the shaft collar having means for moving the latch arm when connecting to the latch collar, the shaft collar having means for receiving the latch arm to hold latch collar and shaft collar to each other, the sheath attached to the shaft collar, the shaft collar having an interior passage for receiving the tube cleaning shaft and cleaning fluid from the inner duct passage and for directing the shaft and the fluid into the sheath channel, and means for establishing a fluid tight seal between the shaft collar and the inner duct.

2. A coupling as defined in claim 1 in which there are a plurality of latch arms.

3. A coupling as defined in claim 1 in which the means for establishing a fluid tight seal comprises a sealing surface on the shaft collar cooperating with a sealing element on the inner duct.

4. A coupling as defined in claim 1 in which the means for establishing a fluid tight seal comprises a sealing element on the shaft collar cooperating with a sealing surface on the inner duct.

5. A quick connect drive shaft coupling comprising a driver manifold assembly and a driven shaft assembly, the driver manifold assembly comprising a latch collar defined by a cylindrical body wall with wall openings, latch arms with latch bars mounted in the openings and spring biased to a normal position, an inner duct positioned in the latch collar, the inner duct having an annular exterior groove for positioning a sealing element, the driven shaft assembly comprising a driven shaft collar defined by a cylindrical body with a generally tubular inner surface forming an interior passage, the shaft collar having a front surface and an external groove wherein the front surface engages and lifts the latch arms for placing the latch bars in the external groove when the manifold assembly and shaft assembly are coupled, the shaft collar having an interior surface for sealing engagement with the inner duct sealing element, a drive shaft yoke, a drive shaft passing through the yoke, the shaft collar having means for receiving the drive shaft yoke, and retaining means for securing the yoke to the shaft collar, the latch arms are mounted on offset pivot pins to provide a fulcrum near one end of each arm to give the other end of the arm a greater range of movement to disengage the arm from the shaft collar.

6. A quick connect drive shaft coupling for passage of cleaning fluid in a tube cleaning machine, the coupling comprising a driver manifold assembly and a driven shaft assembly, a flexible drive shaft passing through the coupling, the driver manifold assembly comprising a latch collar defined by a cylindrical body wall, the latch collar having wall openings, latch arms pivotally mounted in the openings and spring biased to a normal position, each latch arm having a latch bar, an inner duct positioned in the latch collar and having a sealing element about its outer surface, the driven shaft assembly comprising a driven shaft collar defined by a cylindrical body with a generally tubular inner surface forming an interior passage, the shaft collar having a front surface and an adjacent external groove wherein the front surface engages and lifts the latch arms for placing the latch bars in the external groove when the manifold assembly and shaft assembly are coupled, the shaft collar having a sealing surface for engagement with the inner duct sealing element, a drive shaft yoke, the shaft collar having an interior annular rib with an annular channel for receiving a the drive shaft yoke and drive shaft, retaining means for securing the yoke to the annular rib and channel, the latch arms are mounted on offset pivot pins to provide a fulcrum near one end of each arm to give the other end of the arm a greater range of movement to disengage the arm from the shaft collar, the assembled coupling defining a fluid tight passage for passage of a rotary drive shaft and cleaning fluid.

7. A quick connect drive shaft coupling for a tube cleaning machine comprising a driver manifold assembly, a driven shaft assembly, and a drive shaft yoke assembly, the driver manifold assembly comprising a machine wall having an opening therein, an inner duct situated through the opening and secured to the opening by retaining means and by a latch collar, the inner duct having a sealing element about its outer surface, the latch collar defined by a cylindrical body wall, the latch collar having wall openings, latch arms pivotally mounted in the openings and spring biased to a normal position, each latch arm having a latch bar, the driven shaft assembly comprising a driven shaft collar defined by a cylindrical body with a generally tubular inner surface forming an interior passage, the shaft collar having a front surface and an adjacent external groove wherein the front surface engages and lifts the latch arms for placing the latch bars in the external groove when the manifold assembly and shaft assembly are coupled, the shaft collar having a sealing surface for engagement with the inner duct sealing element, the shaft collar having an interior annular rib with an annular channel for receiving a drive shaft yoke, retaining means for securing the yoke subassembly to the annular rib and channel, the drive shaft yoke defining a tubular body with an interior passage, a sheath secured to the inner surface of the yoke for encasing a flexible drive shaft and defining an interior channel for flow of fluid from the tube cleaning machine, the flexible drive shaft extending from a near end at the interior of the tube cleaning machine, through the inner duct, through the yoke and sheath for rotating a tube cleaning brush positioned at the far end of the shaft, whereby a fluid tight passage is defined through the assembled coupling for passage of rotary drive shaft and cleaning fluid to the far end of the rotary shaft.

8. A coupling for a tube cleaning machine having a drive motor, the coupling comprising:
- a tube cleaning shaft rotated by the drive motor,
- a sheath encasing the shaft and defining a channel for flow of cleaning fluid,
- an inner duct attached to the machine, the duct having an interior passage for the tube cleaning shaft and for cleaning fluid, the inner passage providing a sealing surface for establishing a fluid tight seal through the coupling,
- a latch collar attached to the inner duct, the latch collar having latch arms mounted for radial movement in openings in the latch collar, the latch arms biased to a closed position, a latch bar integral with each latch arm,
- a shaft collar for connecting the tube cleaning shaft to the tube cleaning machine through the latch collar, the shaft collar having means for moving the latch arms when connecting to the latch collar, the shaft collar having means for receiving the latch bars in closed position to hold latch collar and shaft collar to each other, the shaft collar having a barbed insert, the sheath attached to the barbed insert, the shaft collar and barbed insert defining an interior passage for receiving tube cleaning shaft and cleaning fluid from inner duct passage and for directing shaft and fluid into the sheath channel, and
- the shaft collar having a sealing element cooperating with the inner duct sealing surface for establishing a fluid tight seal for cleaning fluid passing through the coupling, the latch arms are mounted on offset pivot pins to provide a fulcrum near one end of each arm to give the other end of the arm a greater range of movement to disengage the arm from the shaft collar.

* * * * *